(12) United States Patent
Yang et al.

(10) Patent No.: US 12,643,244 B2
(45) Date of Patent: Jun. 2, 2026

(54) GRIPPING MECHANISM, LOADING DEVICE AND LOADING CONTROL METHOD

(71) Applicant: CONTEMPORARY AMPEREX TECHNOLOGY CO., LIMITED, Ningde (CN)

(72) Inventors: Yule Yang, Ningde (CN); Panze Zheng, Ningde (CN); Wentao Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 55 days.

(21) Appl. No.: 18/530,240

(22) Filed: Dec. 6, 2023

(65) Prior Publication Data

US 2024/0424689 A1 Dec. 26, 2024

Related U.S. Application Data

(63) Continuation of application No. PCT/CN2023/101949, filed on Jun. 21, 2023.

(51) Int. Cl.
B25J 15/00 (2006.01)
B25J 9/16 (2006.01)
(Continued)

(52) U.S. Cl.
CPC ......... B25J 15/0028 (2013.01); B25J 9/1669 (2013.01); B25J 15/0061 (2013.01);
(Continued)

(58) Field of Classification Search
CPC .......... B23Q 7/04; B23Q 7/048; B23Q 7/046; B23Q 7/103; B25B 1/2478; B25B 5/003;
(Continued)

(56) References Cited

U.S. PATENT DOCUMENTS

| 4,335,873 | A | * | 6/1982 | Kiefer | ..................... B25B 5/163 |
| | | | | | 269/274 |
| 2006/0072988 | A1 | * | 4/2006 | Hariki | ......................... B25J 5/02 |
| | | | | | 414/282 |

(Continued)

FOREIGN PATENT DOCUMENTS

| CN | 107378996 A | 11/2017 |
| CN | 212763500 U | 3/2021 |

(Continued)

OTHER PUBLICATIONS

Extended European Search Report issued Jul. 17, 2024 in European Patent Application No. 23806164.2.

(Continued)

*Primary Examiner* — Tyrone V Hall, Jr.
(74) *Attorney, Agent, or Firm* — XSENSUS LLP

(57) ABSTRACT

The present application discloses a gripping mechanism, a loading device and a loading control method. The gripping mechanism includes a base body and a first gripping assembly. A clamping zone is configured on one side of the base body. The first gripping assembly includes a first jaw and a second jaw, with the first jaw being arranged on one of two opposite sides of the clamping zone, and the second jaw being arranged on the other side; wherein at least one of the first jaw and the second jaw is movably connected to the base body, such that a spacing between the first jaw and the second jaw is adjustable, so that the requirements for gripping plates of different specifications and sizes can be met. That is, the gripping mechanism according to embodiments of the present application can be compatible with plates of different specifications and sizes.

19 Claims, 6 Drawing Sheets

(51) Int. Cl.
    *B25J 15/02*         (2006.01)
    *B25J 15/06*         (2006.01)

(52) U.S. Cl.
    CPC ....... *B25J 15/0253* (2013.01); *B25J 15/0293*
            (2013.01); *B25J 15/0616* (2013.01)

(58) Field of Classification Search
    CPC .. B25B 5/006; B25B 5/02; B25H 1/08; B25H
            1/10; B25J 11/005; B25J 11/0095; B25J
            11/0028; B25J 15/0052; B25J 15/0061;
            B25J 15/0066; B25J 15/0253; B25J
            15/026; B25J 15/0273; B25J 15/06; B25J
            15/0616; B25J 9/0096; B25J 9/1669
    See application file for complete search history.

(56)             References Cited

U.S. PATENT DOCUMENTS

| | | | |
|---|---|---|---|
| 2006/0107814 A1* | 5/2006 | Thompson | B25B 5/109 |
| | | | 83/452 |
| 2020/0122342 A1* | 4/2020 | Mukou | B25J 15/0052 |

FOREIGN PATENT DOCUMENTS

| | | | | |
|---|---|---|---|---|
| CN | 214454876 U | | 10/2021 |
| CN | 214643710 U | | 11/2021 |
| CN | 113979106 A | | 1/2022 |
| CN | 114083561 A | | 2/2022 |
| CN | 216858683 U | * | 7/2022 |
| CN | 216859754 U | | 7/2022 |
| CN | 114888836 A | | 8/2022 |
| CN | 218195259 U | | 1/2023 |
| DE | 202023100120 U1 | | 1/2023 |
| EP | 4098411 A1 | | 12/2022 |

OTHER PUBLICATIONS

International Search Report and Written Opinion mailed on Nov. 24, 2023, received for PCT Application PCT/CN2023/101949, filed on Jun. 21, 2023, 14 pages including English Translation.

Notification to Grant Patent Right issued Dec. 10, 2025 in Chinese Patent Application No. 202380060317.1 with English translation thereof.

* cited by examiner

220

222

1

GRIPPING MECHANISM, LOADING DEVICE AND LOADING CONTROL METHOD

CROSS-REFERENCE TO RELATED APPLICATION

This application is a Continuation of International Application No. PCT/CN2023/101949, filed on Jun. 21, 2023, which is incorporated herein by reference in its entirety.

TECHNICAL FIELD

The present application relates to the technical field of mechanical gripping, and in particular to a gripping mechanism, a loading device and a loading control method.

BACKGROUND

Products are usually configured in multiple sizes, and plates in the corresponding products are usually configured in multiple sizes and specifications; and in the production process of the products, a gripping mechanism is usually configured to grip the plates. In the production process of products of different sizes and specifications, the gripping mechanism needs to grip plates of different specifications and sizes; however, the gripping mechanism can only grip plates of a single size, but cannot be compatible with the use requirements for gripping plates of multiple specifications and sizes.

The above statements are provided merely to provide background information related to the present application and do not necessarily constitute the prior art.

SUMMARY

An objective of embodiments of the present application is to provide a gripping mechanism, a loading device and a loading control method, including but not limited to solving the problems in the related art that the gripping mechanism can only grip plates of a single size, but cannot be compatible with the use requirements for gripping plates of multiple specifications and sizes.

The technical solutions adopted in the embodiments of the present application are as follows.

In a first aspect, a gripping mechanism is provided. The gripping mechanism includes a base body and a first gripping assembly. A clamping zone is configured on one side of the base body. The first gripping assembly includes a first jaw and a second jaw, with the first jaw being arranged on one of two opposite sides of the clamping zone, and the second jaw being arranged on the other side; wherein at least one of the first jaw and the second jaw is movably connected to the base body, such that a spacing between the first jaw and the second jaw is adjustable.

In the gripping mechanism of the embodiments of the present application, a plate is located in the clamping zone, and the first jaw and the second jaw respectively abut against two opposite sides of the plate to clamp the plate, thereby realizing the gripping of the plate; and the spacing between the first jaw and the second jaw can be adjusted, so that the first jaw and the second jaw can clamp plates of different specifications and sizes, so as to meet the requirements for gripping plates of different specifications and sizes. That is, the gripping mechanism of the embodiments of the present application can be compatible with plates of different specifications and sizes.

In one embodiment, when the first jaw is movably connected to the base body, the first gripping assembly further includes a first adjusting member connected to the first jaw, the base body is configured with a plurality of first mounting positions, and the first adjusting member is connected to different first mounting positions such that the spacing between the first jaw and the second jaw is variable.

By adopting the technical solution of this embodiment, when the first adjusting member is mounted in a first mounting position, the spacing between the first jaw and the second jaw is relatively fixed, so that one first mounting position can correspond to a plate of one specification and size. Then, in an actual gripping process, it is possible to quickly find the first mounting position corresponding to the target plate of the specification and size, and to connect the first adjusting member to the first mounting position corresponding to the target plate of the specification and size, so that the accuracy of the adjustment operation is high, and the operation is simple, convenient and fast.

In one embodiment, the first gripping assembly further includes a first locking member, and the first locking member is configured to lock the first adjusting member to different first mounting positions.

By adopting the technical solution of this embodiment, the first adjusting member can be connected to different first mounting positions by operating the first locking member, so as to change the spacing between the first jaw and the second jaw, so that the adjustment operation is simple and convenient.

In one embodiment, the first locking member includes a first fastener, each of the first mounting positions is provided with a first connecting hole, the first adjusting member is provided with a second connecting hole, and the first fastener passes through the first connecting hole and the second connecting hole to lock the first adjusting member to the first mounting position.

By adopting the technical solution of this embodiment, the locking between the first adjusting member and the first mounting position takes the form of the first fastener, the structure is simple, and the adjustment operation is convenient and fast.

In one embodiment, the first gripping assembly further includes a first detection module, and the first mounting position connected to the first adjusting member is a first detection position; and the first detection module is configured to obtain position information of the first detection position and send the position information of the first detection position.

By adopting the technical solution of this embodiment, it is possible to detect whether the first adjusting member is connected to the first mounting position corresponding to the target plate, so that the gripping mechanism can subsequently grip the target plate stably and reliably, reducing the error rate of processing and change of the plate.

In one embodiment, the first detection module includes a first trigger and a plurality of first detectors, wherein the plurality of first detectors are arranged in one-to-one correspondence with the plurality of first mounting positions, the first trigger is connected to the first adjusting member, and the first trigger is configured to trigger the first detector corresponding to the first detection position to send the position information of the first detection position.

By adopting the technical solution of this embodiment, it is possible to detect whether the first adjusting member is connected to the first mounting position corresponding to the target plate by the first trigger triggering the first detector corresponding to the first detection position, so that the first detection module has a simple structure and is convenient to process and manufacture.

In one embodiment, the first detector includes a proximity switch, and the first trigger includes a metal trigger configured to trigger the proximity switch.

By adopting the technical solution of this embodiment, the structural form in which the metal trigger triggers the proximity switch is used, and the triggering accuracy is thus high, so that the accuracy of detection of the position information of the first detection position is good, and the structure is simple, facilitating the reduction of the cost of the gripping mechanism.

In one embodiment, when the second jaw is movably connected to the base body, a movable connection structure between the second jaw and the base body is the same as the movable connection structure between the first jaw and the base body.

By adopting the technical solution of this embodiment, the movable connection structure between the second jaw and the base body is the same as the movable connection structure between the first jaw and the base body, so that the processing and manufacturing of the gripping mechanism is more convenient.

In one embodiment, the first jaw further includes a first driving member, the first driving member is connected to the first adjusting member and the first jaw, and the first driving member is configured to drive the first jaw to move toward the second jaw, so as to clamp a plate located in the clamping zone.

By adopting the technical solution of this embodiment, the plate is located in the clamping zone, and the first driving member can drive the first jaw to move toward the second jaw so as to clamp the plate and realize the gripping of the plate.

In one embodiment, a side portion of the first jaw that faces the clamping zone is provided with a first protective member configured to abut against an edge portion of the plate, and the first protective member has a hardness range of 20 HD-100 HD; and/or a side portion of the second jaw that faces the clamping zone is provided with a second protective member configured to abut against a further edge portion of the plate, and the second protective member has a hardness range of 20 HD-100 HD.

By adopting the technical solution of the embodiment of the present application, during the clamping of the plate, the protective member (the first protective member and/or the second protective member) abuts against the edge portion of the plate, and can stably and reliably abut against the plate to obtain good accuracy in positioning the plate, but it will not be too hard to damage the plate.

In one embodiment, the gripping mechanism further includes a second gripping assembly, wherein the second gripping assembly includes a third jaw and a fourth jaw: the third jaw is arranged on one of two further opposite sides of the clamping zone, and the fourth jaw is arranged on the other side; and at least one of the third jaw and the fourth jaw is movably connected to the base body to adjust a spacing between the third jaw and the fourth jaw.

By adopting the technical solution of this embodiment, the first jaw and the second jaw clamp the plate from the two opposite sides of the plate, and the third jaw and the fourth jaw clamp the plate from two further opposite sides of the plate. In this way, there are many clamping points for the plate, and the stability of clamping and gripping is good. In addition, the spacing between the third jaw and the fourth jaw can be adjusted, so that the third jaw and the fourth jaw can relatively approach each other to realize the gripping of the plate, and it is also possible to meet the requirements for gripping plates of more specifications and sizes.

In one embodiment, when the third jaw is movably connected to the base body, the second gripping assembly further includes a second driving member, the second driving member is connected to the third jaw and the base body, and the second driving member is configured to drive the third jaw to move so as to adjust the spacing between the third jaw and the fourth jaw; and when the fourth jaw is movably connected to the base body, the second gripping assembly further comprises a third driving member, the third driving member is connected to the fourth jaw and the base body, and the third driving member is configured to drive the fourth jaw to move so as to adjust the spacing between the third jaw and the fourth jaw.

By adopting the technical solution of this embodiment, the overall structure is simple and is convenient to process and manufacture.

In one embodiment, the gripping mechanism further includes a moving assembly, wherein the moving assembly is connected to the base body, and the moving assembly is configured to drive the base body to move.

By adopting the technical solution of this embodiment, the moving assembly drives the base body, the first gripping assembly connected to the base body, and other components to move, and the moving assembly can move the base body, the first gripping assembly, and other components to a bin mechanism for storing the plate for gripping. After the gripping is completed, the moving assembly moves the plate to a subsequent processing apparatus for processing, so as to realize the gripping and delivering of the plate.

In one embodiment, a side portion of the base body that faces the clamping zone is provided with a suction member configured to suction the plate.

By adopting the technical solution of this embodiment, the suction member suctions and fixes the plate in the clamping zone first, then the clamping of the plate by the first jaw and the second jaw is more convenient and fast, and the clamping is more stable and reliable. In addition, after being clamped by the first jaw and the second jaw, the plate is suctioned by the suction member, so that the risk of the plate falling between the first jaw and the second jaw can be reduced, facilitating the improvement of the yield rate.

In one embodiment, the suction member includes a connecting portion and an elastic portion, wherein the connecting portion is connected to the base body and the elastic portion, the elastic portion is located at a side portion of the connecting portion that faces the clamping zone, and a surface of the elastic portion that faces the clamping zone is provided with a vacuum suction hole configured to suction the plate.

By adopting the technical solution of this embodiment, the design of the elastic portion enables an elastic contact between the plate and the suction member, facilitating the reduction of the damage to the plate: moreover, the plate is suctioned by means of the vacuum suction hole, so that the structure is simple and is convenient to manufacture.

In one embodiment, the side portion of the base body that faces the clamping zone is further provided with a limiting member, and a side surface of the limiting member that faces the clamping zone is configured to abut against the plate.

By adopting the technical means of this embodiment, it is possible that during the suction of the plate to the elastic portion by means of the vacuum suction hole, the plate may abut against the side surface of the limiting member that faces the clamping zone, so as to prevent the plate from continuing to squeeze the elastic portion, and reduce the risk of excessive squeezing of the elastic portion: moreover, it is also possible to realize the accurate positioning of the plate and improve the accuracy of subsequent operations.

In one embodiment, the gripping mechanism further includes a distance detector, wherein the distance detector is configured to detect a distance value between the plate and the distance detector: when the distance value is within a preset range, the plate is located in the clamping zone; and the distance detector is further configured to send a gripping signal for gripping the plate.

By adopting the technical solution of this embodiment, the distance detector is used to determine whether there is a plate in the clamping zone, so that the risk of the gripping mechanism gripping nothing is reduced, and it is also possible to enable the gripping mechanism to grip the plate stably and reliably.

In one embodiment, the gripping mechanism further includes a sensing member, wherein the sensing member is configured to sense the plate in the clamping zone.

By adopting the technical solution of this embodiment, it is possible to determine whether the gripping mechanism has successfully griped the plate by means of the sensing member, and it is also possible to detect whether the plate has fallen during the movement of the plate.

In a second aspect, provided is a loading device, including a gripping mechanism of the above embodiments.

In one embodiment, the loading device further includes a bin mechanism configured to store plates, wherein the bin mechanism includes a rack and a storage assembly, the storage assembly is connected to the rack, and the storage assembly is capable of storing the plates of different specifications and sizes.

Through the technical solution of this embodiment, the storage assembly can store plates of different specifications and sizes, so that it is possible to increase the general scope of the bin mechanism: moreover, the storage assembly can also be adapted to the gripping mechanism that can grip plates of different specifications and sizes, facilitating the improvement of the production efficiency.

In one embodiment, the storage assembly includes a support member and a storage module, wherein the support member is connected to the rack: the storage module includes a first storage member and a second storage member arranged on the support member, and a storage zone for storing the plates is formed between the first storage member and the second storage member; and at least one of the first storage member and the second storage member is movably connected to the support member, such that a spacing between the first storage member and the second storage member is adjustable.

By adopting the technical solution of this embodiment, the spacing between the first storage member and the second storage member can be adjusted, that is, the size of the storage zone can be adjusted, so that it is possible to meet the requirements for placing plates of different specifications and sizes, so as to enable the bin mechanism to be compatible with plates of different specifications and sizes.

In one embodiment, on the basis that the first storage member is movably connected to the base body, the support member is configured with a plurality of second mounting positions, and the first storage member is connected to different second mounting positions such that the spacing between the first storage member and the second storage member is variable.

By adopting the technical solution of this embodiment, when the first storage member is mounted in the second mounting position, the spacing between the first storage member and the second storage member is relatively fixed, so that one second mounting position can correspond to a plate of one specification and size. Then, in a loading process of the bin mechanism, the first storage member can be quickly connected to the second mounting position corresponding to the plate to be loaded, and the loading operation is convenient. In addition, during the gripping of the plate, the storage zone of the target plate can also be quickly found by means of the second mounting position.

In one embodiment, the storage module further includes a second locking member, and the second locking member is configured to lock the first storage member to different second mounting positions.

By adopting the technical solution of this embodiment, the first storage member can be connected to different second mounting positions by operating the second locking member, so as to change the spacing between the first storage member and the second storage member, so that the adjustment operation is simple and convenient.

In one embodiment, the storage module further includes a second detection module, and the second mounting position connected to the first storage member is a second detection position; and the second detection module is configured to obtain position information of the second detection position and send the position information of the second detection position.

By adopting the technical solution of this embodiment, it is possible to detect whether the storage module stores a target plate, so that the gripping mechanism can subsequently the target plate accurately, reducing the error rate of processing and change of the plate.

In one embodiment, the second detection module includes a second trigger and a plurality of second detectors, wherein the plurality of second detectors are arranged in one-to-one correspondence with the plurality of second mounting positions, the second trigger is connected to the first storage member, and the second trigger is configured to trigger the second detector corresponding to the second detection position to send the position information of the second detection position.

By adopting the technical solution of this embodiment, it is possible to detect whether the first storage member is connected to the second mounting position corresponding to the target plate by the second trigger triggering the second detector corresponding to the second detection position, so that the second detection module has a simple structure and is convenient to process and manufacture.

In one embodiment, when the second storage member is movably connected to the support member, a movable connection structure between the second storage member and the support member is the same as the movable connection structure between the first storage member and the support member.

By adopting the technical solution of this embodiment, the movable connection structure between the second storage member and the support member is the same as the movable connection structure between the first storage member and the support member, the structure is simpler, and the processing and manufacturing is convenient.

In one embodiment, the bin mechanism includes a plurality of storage assemblies, which are located in an accommodating space enclosed by the rack, a top portion of the rack is configured with a first opening for allowing the gripping mechanism to enter the accommodating space, and the plurality of storage assemblies are stacked along the height of the rack; and each of the storage assemblies is connected to a sliding member, and each of the sliding members is slidably connected to the rack, such that the sliding member can drive the corresponding storage assembly to slide in a first direction between the bottom of the first opening and a side of the first opening.

By adopting the technical solution of this embodiment, the design of a plurality of storage assemblies can meet the requirements for storing more plates, and also enable the bin mechanism to simultaneously store plates of multiple specifications and sizes, so as to facilitate the change of plates. In addition, the storage assembly can move from the bottom of the first opening to a side of the first opening, so that a lower storage assembly located below this storage assembly can be exposed, so as to facilitate the gripping assembly to grip a plate on the lower storage assembly.

In one embodiment, the rack is configured with a second opening in communication with the accommodating space, and the storage assembly is slidably connected to the sliding member, such that the storage assembly can enter and exit the accommodating space through the second opening in a second direction.

By adopting the technical solution of this embodiment, the storage assembly can be moved out of the accommodating space through the second opening, and the storage assembly is exposed outside the rack, so that the loading of the plate of the storage assembly can be facilitated.

In one embodiment, the first direction is parallel to the second direction.

By adopting the technical solution of this embodiment, the sliding direction of the sliding member relative to the rack is parallel to the sliding direction of the storage assembly relative to the sliding member. In this design, a single sliding direction is provided, the structure of the bin mechanism can be designed more simply, and the risk of sliding interference can also be reduced.

In one embodiment, the bin mechanism further comprises a third locking member configured to lock and connect the sliding member to the storage assembly.

By adopting the technical solution of this embodiment, during the sliding of the sliding member relative to the rack, the third locking member may fixedly connect the sliding member to the storage assembly, so that the sliding member can drive the storage assembly to slide relative to the rack, so as to facilitate the gripping assembly to grip a plate stored on the lower storage assembly.

In one embodiment, one of the sliding member and the storage assembly is provided with a locking hole, the other thereof is connected to the third locking member, and an end portion of the third locking member is configured to be inserted into the locking hole, so as to lock and connect the sliding member to the storage assembly.

By adopting the technical solution of this embodiment, the locking form in which the third locking member cooperates with the locking hole has a simple structure and is convenient to process and manufacture.

In a third aspect, provided is a loading control method, including:

receiving first specification information of a plate that can be griped by a gripping mechanism;

receiving second specification information of a plate stored in a storage module to be unloaded in a bin mechanism; and controlling the gripping mechanism to grip the plate stored in the storage module to be unloaded when the first specification information, the second specification information and specification information of a target plate are consistent with one another.

By adopting the technical solution of this embodiment, it can be accurately determined whether the gripping mechanism is in a state in which the target plate can be gripped, and whether the target plate is stored in the storage module to be unloaded. When the first specification information, the second specification information and the specification information of the target plate are consistent with one another, the gripping mechanism can grip the target plate, and the target plate is stored in the storage module to be unloaded, so that the gripping mechanism can stably grip the target plate from the storage module, so as to accurately deliver the target plate to a subsequent apparatus, thereby reducing the error rate of change of the plate.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

DESCRIPTION OF DRAWINGS

In order to more clearly illustrate the technical solutions in the embodiments of the present application, the drawings to be used in the description of the embodiments of the present application or the prior art will be described briefly below. Obviously, the drawings in the following description are merely for some embodiments of the present application. For those of ordinary skill in the art, other drawings can also be obtained according to these drawings without involving any inventive effort.

Figure 1:
FIG. 1 is a schematic structural diagram of a gripping mechanism provided in an embodiment of the present application.
Figure 1:
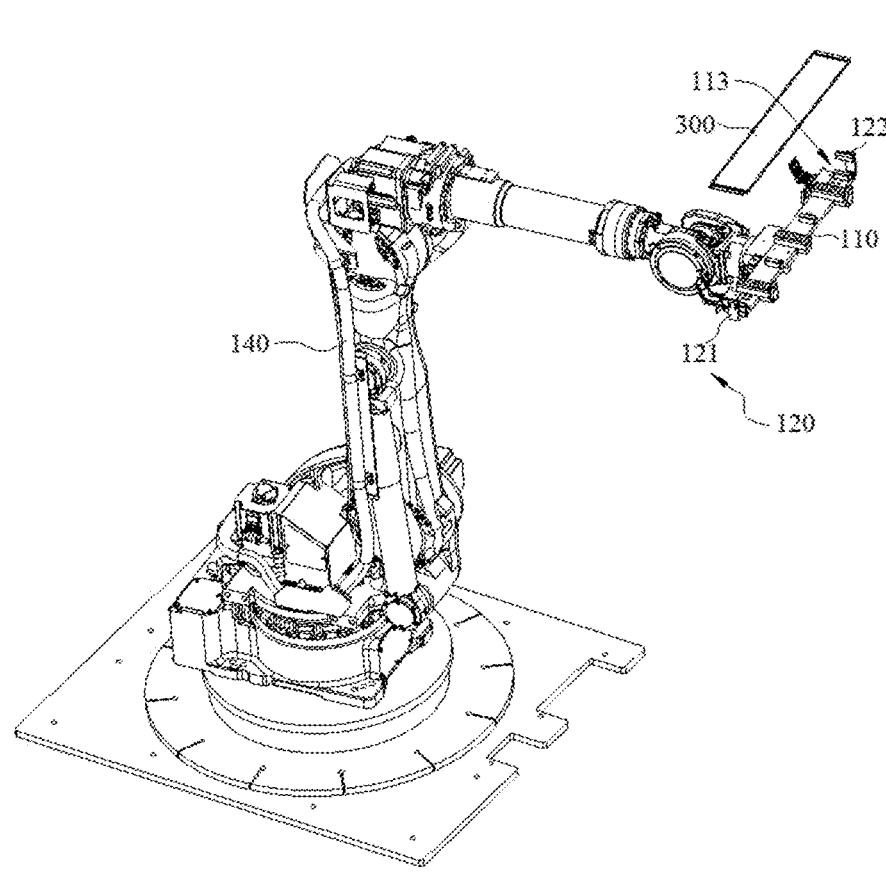

Reference signs in the accompanying drawings are as follows.

10. loading device; 100. gripping mechanism; 110. base body; 111. first mounting position; 1111. first connecting hole; 112. third mounting position; 1121. third connecting hole; 113. clamping zone; 120. first gripping assembly; 121. first jaw; 122. second jaw; 123. first adjusting member; 1231. second connecting hole; 124. first detection module; 1241. first trigger; 1242. first detector; 125. first driving member; 126. second adjusting member; 1261. fourth connecting hole; 127. third detection module; 1271. third trigger; 1272. third detector; 128. first protective member; 1281. first inclined surface; 129. second protective member; 1291. second inclined surface; 130. second gripping assembly; 131. third jaw; 132. fourth jaw; 133. second driving member; 134. third protective member; 1341. third inclined surface; 135. fourth protective member; 1351. fourth inclined surface; 140. moving assembly; 150. suction member; 151. connecting portion; 152. elastic portion; 1521. vacuum suction hole; 160. limiting member; 170. distance detector; 180. sensing member;

200. bin mechanism; 210. rack; 211. accommodating space; 212. first opening; 213. second opening; 220. storage assembly; 2201. storage zone; 221. support member; 2211. second mounting position; 2212. locking hole; 2213. fifth connecting hole; 2214. first support plate; 2215. second support plate; 222. storage module; 2221. first storage member; 22211. first insertion groove; 22212. sixth connecting hole; 2222. second storage member; 22221. second insertion groove; 2223. second locking member; 2224. second detection module; 22241. second trigger; 22242. second detector; 2225. intermediate member; 22251. support groove; 2226. first slide rail; 230. sliding member; 240. third locking member; 250. alarm device; 260. switch door assembly; 270. fourth driving member; 281. second slide rail; 2811. guide rail; 2812. sliding block; 282. third slide rail;

300. plate.

DETAILED DESCRIPTION

In order to make the technical problem to be solved by the present application, technical solutions and beneficial effects more clear, the present application will be described in further detail below with reference to the drawings and embodiments. It should be understood that the particular embodiments described herein are only used for illustrating the present application and not intended to limit the present application.

Unless otherwise defined, all technical and scientific terms used herein have the same meaning as commonly understood by those skilled in the art belonging to the technical field of the present application: the terms used herein are intended only for the purpose of describing specific embodiments and are not intended to limit the present application: the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. Thus, the features defined with "first" and "second" can explicitly or implicitly include one or more of the features.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments in any suitable way.

In the description of the embodiments of the present application, the term "and/or" is simply a description of an association of associated objects, which indicates that there may exist three relationships, for example, A and/or B may represent three situations: A exists alone, both A and B exist, and B exists alone. In addition, the character "/" herein generally indicates an "or" relationship between the associated objects.

In the description of the embodiments of the present application, the term "plurality of" refers to at least two (including two); similarly, "plurality of groups" refers to at least two (including two) groups, and "plurality of pieces" refers to at least two (including two) pieces. The term "a number of" means one or more, unless specifically and specifically limited otherwise.

In the description of the embodiments of the present application, the orientation or location relationships indicated by the technical terms "center", "longitudinal", "transverse", "length", "width", "thickness", "up", "down", "front", "back", "left", "right", "vertical", "horizontal", "top", "bottom", "inside", "outside", "clockwise", "counterclockwise", "axial", "radial", "circumferential" and the like are based on the orientation or location relationships shown in the drawings, and are only for convenience and simplification of the description of the embodiments of the present application, but do not indicate or imply that the apparatuses or elements referred to must have particular orientations, be constructed and operated in particular orientations, and therefore cannot be construed as a limitation of the embodiments of the present application.

In the description of the embodiments of the present application, unless otherwise expressly specified and limited, the technical terms "mounting," "connected," "connecting," "fixing", and the like shall be understood in a broad sense, which, for example, may be a fixed connection, or a detachable connection or an integral connection: may also be a mechanical connection, or an electrical connection: may be a direct connection, or an indirect connection through an intermediate medium, and may be a communication within two elements or an interactive relationship between two elements. For those of ordinary skill in the art, the specific meanings of the above terms in the embodiments of the present application can be understood according to specific situations.

In the description of the embodiments of the present application, unless otherwise expressly specified and limited, when an element is referred to as being "fixed to" or "arranged on" another element, it may be directly on the other element or be indirectly on the other element. When an element is referred to as being "connected" to another element, it may be directly or indirectly connected to the other element.

Products are usually configured in multiple sizes, and plates in the corresponding products are usually configured in multiple sizes and specifications; and in the production process of the products, a gripping mechanism is usually configured to grip the plates. In the production process of products of different sizes and specifications, the gripping mechanism needs to grip plates of different specifications and sizes; however, the gripping mechanism can only grip plates of a single size, but cannot be compatible with the use requirements for gripping plates of multiple specifications and sizes.

In order to clearly illustrate the above problems, the embodiments of the present application takes a gluing process of a side plate of a battery as an example for illustration. Before the side plate is glued, the gripping mechanism will grip the side plate, that is, the gripping mechanism needs to abut against two opposite edge portions of the side plate to clamp the plate, thereby realizing the gripping of the side plate of the battery, and finally, the gripped side plate of the battery is gripped into a gluing device for gluing. The gluing device can usually meet the requirements for gluing side plates of multiple sizes and specifications, so when faced with the gluing requirements for different sizes and specifications, the gripping mechanism needs to grip the side plates of different specifications and sizes into a gluing apparatus. However, the gripping mechanism in the related art can only meet the requirements for gripping side plates of a single size and specification, but cannot meet the gripping requirements for multiple specifications and sizes.

Based on the above considerations, embodiments of the present application provide a gripping mechanism. The gripping mechanism includes a base body and a first gripping assembly. A clamping zone is configured on one side of the base body. The first gripping assembly includes a first jaw and a second jaw located on two opposite sides of the clamping zone, and at least one of the first jaw and the second jaw is movably connected to the base body, such that a spacing between the first jaw and the second jaw is adjustable. When a plate is located in the clamping zone, the first jaw and the second jaw respectively abut against two opposite sides of the plate to clamp the plate, thereby realizing the gripping of the plate; and the spacing between the first jaw and the second jaw can be adjusted, so that the first jaw and the second jaw can clamp plates of different specifications and sizes, so as to meet the requirements for gripping plates of different specifications and sizes. That is, the gripping mechanism of the embodiments of the present application can be compatible with plates of different specifications and sizes. The gripping mechanism of the embodiments of the present application can be applied to the gluing process of the side plate of the battery, filling and heating of a battery cell, and other battery production processes that need to grip a plate.

The gripping mechanism 100 is described below in conjunction with some embodiments.

Figure 2:
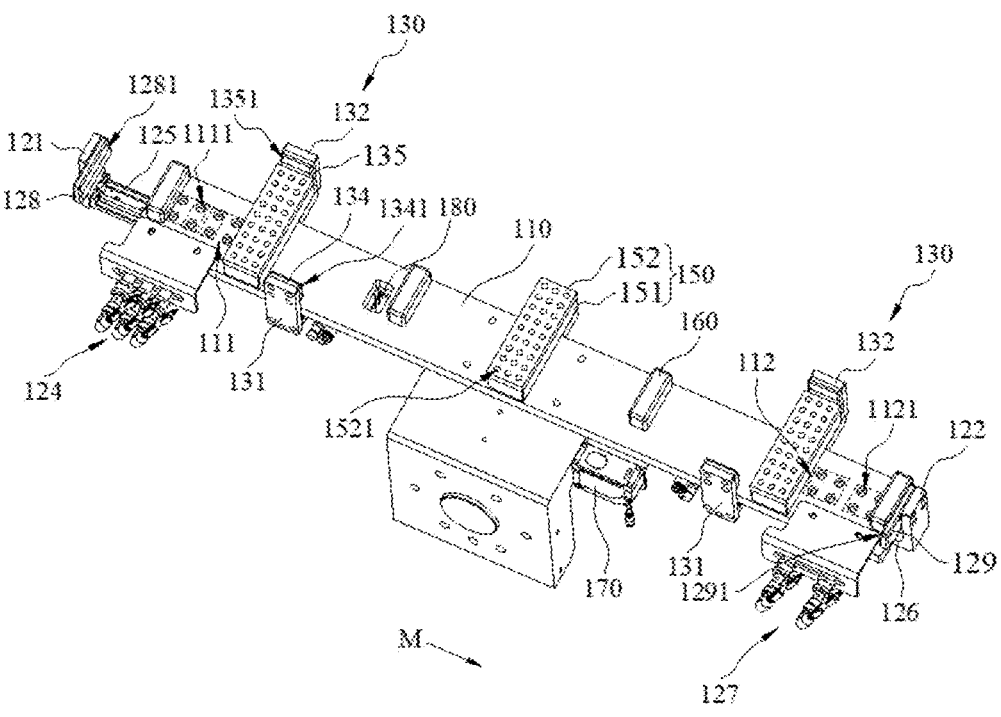
FIG. 2 is a structural schematic diagram of the gripping mechanism shown in FIG. 1 when viewed from one perspective, with a moving assembly hidden.

As shown in FIGS. 1 to 2, in one embodiment of the present application, a gripping mechanism 100 is provided. The gripping mechanism 100 includes a base body 110 and a first gripping assembly 120. A clamping zone 113 is configured on one side of the base body 110. The first gripping assembly 120 includes a first jaw 121 and a second jaw 122. The first jaw 121 is arranged on one of two opposite sides of the clamping zone 113, and the second jaw 122 is arranged on the other side. At least one of the first jaw 121 and the second jaw 122 is movably connected to the base body 110, such that a spacing between the first jaw 121 and the second jaw 122 can be adjusted.

The base body 110 may refer to a base body 110 on which the first gripping assembly 120 is mounted, which mainly functions to support and fix the first gripping assembly 120. In order to improve the structural strength of the base body 110, the material of the base body 110 may be selected from iron, alloy, stainless steel, or other metal materials. The base body 110 may be of a structural form such as a plate 300, a frame, etc., and the base body 110 may have various shapes, for example: square, circle, and triangle.

The clamping zone 113 may refer to a zone between the first jaw 121 and the second jaw 122.

The first gripping assembly 120 may refer to an assembly for gripping the plate 300. The first gripping assembly 120 includes a first jaw 121 and a second jaw 122. The first jaw 121 refers to a component of the first gripping assembly 120 that is located on one side of the clamping zone 113, and the second jaw 122 refers to a component of the first gripping assembly 120 that is located on the opposite side to the first jaw 121 in the clamping zone 113. When a plate 300 is located in the clamping zone 113, the first jaw 121 and the second jaw 122, which are located on two sides of the clamping zone 113, respectively clamp two opposite sides of the plate 300, so that the gripping of the plate 300 is realized. In order to improve the clamping stability, the first jaw 121 and the second jaw 122 are generally made of metal materials (e.g., stainless steel, and iron).

At least one of the first jaw 121 and the second jaw 122 is movably connected to the base body 110, such that a spacing between the first jaw 121 and the second jaw 122 can be adjusted. It can be understood that it is possible that the first jaw 121 is movably connected to the base body 110, and the spacing between the first jaw 121 and the second jaw 122 can be changed by adjusting the first jaw 121. It is also possible that the second jaw 122 is movably connected to the base body 110, and the spacing between the first jaw 121 and the second jaw 122 can be changed by adjusting the second jaw 122. it is also possible that the first jaw 121 and the second jaw 122 are both movably connected to the base body 110, and the spacing between the first jaw 121 and the second jaw 122 can be changed by adjusting the first jaw 121 and the second jaw 122. The movable connection may mean that two components connected to each other can move relative to each other. For example, one of the components may be driven by a driving member to move relative to the other component. The movable connection may also refer to the connection between two components through a movable connection such as a sliding connection.

The working process of the gripping mechanism 100 of the embodiments of the present application is as follows.

In the case of needing to grip the plate 300 or change to clamp a plate 300 of a new specification, the spacing between the first jaw 121 and the second jaw 122 is first adjusted into a clamping size range of the target plate 300, then when the plate 300 is located in the clamping zone 113, the first jaw 121 and the second jaw 122 clamp the plate 300 in the clamping zone 113, thus realizing the gripping of the plate 300.

In the gripping mechanism 100 of the embodiments of the present application, a plate 300 is located in the clamping zone 113, and the first jaw 121 and the second jaw 122 respectively abut against two opposite sides of the plate 300 to clamp the plate 300, thereby realizing the gripping of the plate 300; and the spacing between the first jaw 121 and the second jaw 122 can be adjusted, so that the first jaw 121 and the second jaw 122 can clamp plates 300 of different specifications and sizes, so as to meet the requirements for gripping plates 300 of different specifications and sizes. That is, the gripping mechanism 100 of the embodiments of the present application can be compatible with plates 300 of different specifications and sizes.

Figure 3:
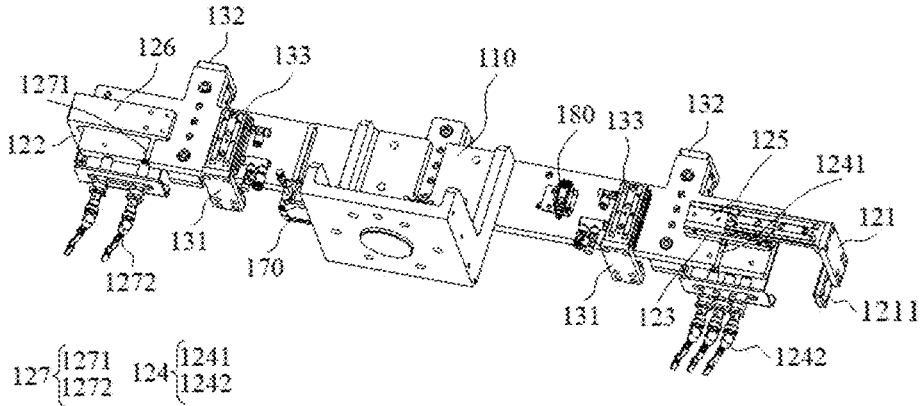
FIG. 3 is a structural schematic diagram of the gripping mechanism shown in FIG. 1 when viewed from another perspective, with the moving assembly hidden.
Figure 4:
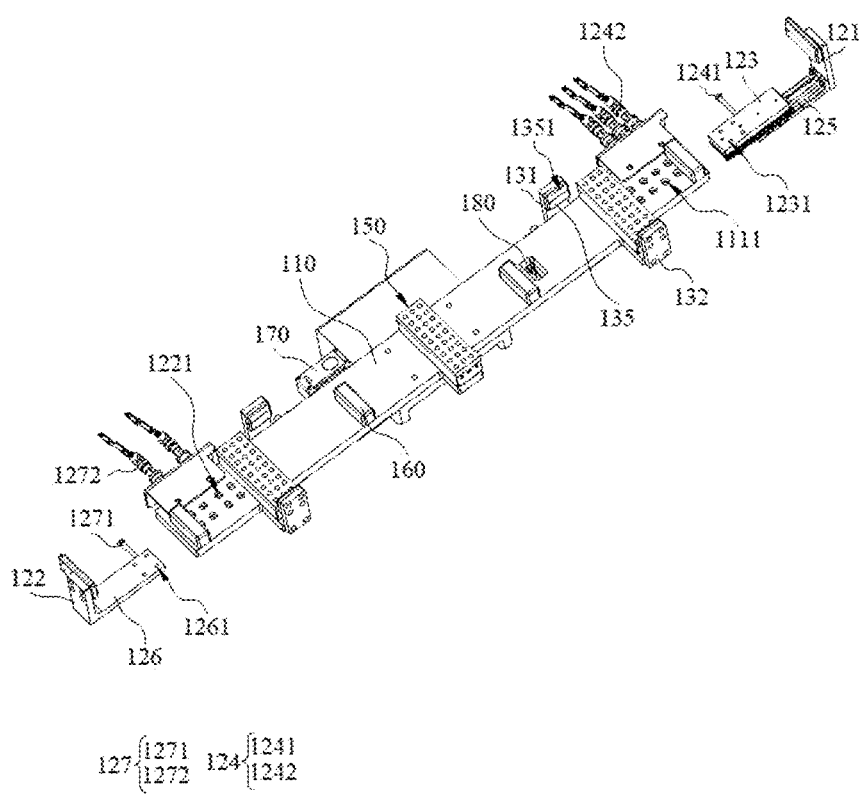
FIG. 4 is an exploded schematic view of the gripping mechanism shown in FIG. 1, with the moving assembly hidden.

In another embodiment of the present application, as shown in FIGS. 2 to 4, for the gripping mechanism 100 provided, when the first jaw 121 is movably connected to the base body 110, the first gripping assembly 120 further includes a first adjusting member 123 connected to the first jaw 121, the base body 110 is configured with a plurality of first mounting positions 111, and the first adjusting member 123 is connected to different first mounting positions 111 such that the spacing between the first jaw 121 and the second jaw 122 is variable.

The first adjusting member 123 may refer to a component configured to connect the first jaw 121 and the base body 110, and the first adjusting member 123 is movably connected to the base body 110, so that the spacing between the first jaw 121 and the second jaw 122 can be adjusted by changing the connection position of the first adjusting member 123 on the base body 110.

The first mounting position 111 may refer to a position of the base body 110 that is configured to be connected to the first adjusting member 123; and the plurality of first mounting positions 111 may refer to two, three, four or more positions formed on the base body 110 for allowing the first adjusting member 123 to be mounted. Illustratively, there are three first mounting positions 111 (reference may be made to the positions indicated by the dotted boxes shown in FIG. 2), and the three first mounting positions 111 are arranged along a third direction (reference may be made to the direction indicated by arrow M shown in FIG. 2). The third direction is a direction from the second jaw 122 to the first jaw 121, the first adjusting member 123 is connected to different first mounting positions 111, and the spacing between the first jaw 121 and the second jaw 122 is variable.

By adopting the technical solution of this embodiment, when the first adjusting member 123 is mounted in a first mounting position 111, the spacing between the first jaw 121 and the second jaw 122 is relatively fixed, so that one first mounting position 111 can correspond to a plate 300 of one specification and size. Then, in an actual gripping process, it is possible to quickly find the first mounting position 111 corresponding to the target plate 300 of the specification and size, and to connect the first adjusting member 123 to the first mounting position 111 corresponding to the target plate 300 of the specification and size, so that the accuracy of the adjustment operation is high, and the operation is simple, convenient and fast.

In another embodiment of the present application, as shown in FIGS. 2 to 4, the first gripping assembly 120 of the gripping mechanism 100 provided further includes a first locking member, and the first locking member is configured to lock the first adjusting member 123 to different first mounting positions 111.

The first locking member may refer to a component capable of locking the first adjusting member 123 to different first mounting positions 111. The first adjusting member 123 is fixed to the first mounting position 111 of the base body 110 via the first locking member. Moreover, the first locking member can also release the locking between the first adjusting member 123 and the first mounting position 111, and then the first adjusting member is fixed to another first mounting position 111 via the first locking member, so that the adjustment of the spacing between the first jaw 121 and the second jaw 122 is realized, so as to be applicable for gripping plates 300 of different specifications and sizes.

By adopting the technical solution of this embodiment, the first adjusting member 123 can be connected to different first mounting positions 111 by operating the first locking member, so as to change the spacing between the first jaw 121 and the second jaw 122, so that the adjustment operation is simple and convenient.

In another embodiment of the present application, as shown in FIGS. 2 to 4, the first locking member of the gripping mechanism 100 provided includes a first fastener, each of the first mounting positions 111 is provided with a first connecting hole 1111, the first adjusting member 123 is provided with a second connecting hole 1231, and the first fastener passes through the first connecting hole 1111 and the second connecting hole 1231 to lock the first adjusting member 123 to the first mounting position 111.

The first fastener may refer to a component configured to securely connect the first adjusting member 123 to the base body 110. The first fastener may be a bolt, a screw, a pin or other components.

The first connecting hole 1111 may refer to a hole structure provided in the first mounting position 111, the second connecting hole 1231 may refer to a hole structure provided in the first adjusting member 123, and the first fastener passes through the first connecting hole 1111 and the second connecting hole 1231 and locks the first adjusting member 123 to the first mounting position 111. For example, the first fastener is a screw, which is in threaded fit with the first connecting hole 1111 after passing through the second connecting hole 1231, so that the first adjusting member 123 and the first mounting position 111 are fixedly connected together. During adjustment, the screw is unscrewed from the second connecting hole 1231, and then the screw is in threaded fit with a first connecting hole 1111 of another first mounting position 111, so as to adjust the spacing between the first jaw 121 and the second jaw 122, so that the adjustment operation is simple, convenient and fast. The first adjusting member 123 may be provided with a plurality of second connecting holes 1231, and each first mounting position 111 then may also be provided with a plurality of first connecting holes 1111 corresponding thereto. There may also be a plurality of first fasteners, and each first fastener passes through the corresponding first connecting hole 1111 and second connecting hole 1231 on a one-to-one basis. There are a plurality of connection points between the first adjusting member 123 and the first mounting position 111 of the base body 110, so that the connection strength between the first adjusting member 123 and the base body 110 is good, facilitating the improvement of the gripping stability and reliability of the plate 300. Illustratively, the first adjusting member 123 is provided with four second connecting holes 1231, each first mounting position 111 is provided with four first connecting holes 1111, the four second connecting holes 1231 are in one-to-one correspondence with the four first connecting holes 1111, and two adjacent first mounting positions 111 share two second connecting holes 1231, so that there is a cross between two adjacent first mounting positions 111. Such a configuration has a compact structure and facilitates the reduction of the size of the gripping mechanism 100.

By adopting the technical solution of this embodiment, the locking between the first adjusting member 123 and the first mounting position 111 takes the form of the first fastener, the structure is simple, and the adjustment operation is convenient and fast.

In another embodiment of the present application, as shown in FIGS. 2 to 4, the first gripping assembly 120 of the gripping mechanism 100 provided further includes a first detection module 124, the first mounting position 111 connected to the first adjusting member 123 is a first detection position; and the first detection module 124 is configured to obtain position information of the first detection position and send the position information of the first detection position.

The first detection position may refer to the first mounting position 111 that is connected to the first adjusting member 123.

It may mean that the first detection module 124 can obtain the position information of the first detection position and send the position information of the first detection position. It can be understood that the first detection module 124 can obtain the position information of the first mounting position 111 that is connected to the first adjusting member 123, i.e. the position information of the first detection position, and send the position information. Then, through the position information, the specification information of the plate 300 corresponding to the first detection position can be known. In practical applications, whether the position information sent by the first detection module 124 is consistent with the position information of the first mounting position 111 corresponding to the target plate 300 can be determined, so as to determine whether the first adjusting member 123 is adjusted to the first mounting position 111 corresponding to the target plate 300. If the position information sent by the first detection module 124 is inconsistent with the position information of the first mounting position 111 corresponding to the target plate 300, the first detection position is not the first mounting position 111 corresponding to the target plate 300, that is, the mounting position of the first adjusting member 123 is incorrect: otherwise, the position information sent by the first detection module 124 is consistent with the position information of the first mounting position 111 corresponding to the target plate 300, the first detection position is the first mounting position 111 corresponding to the target plate 300, and the mounting position of the first adjusting member 123 is correct.

By adopting the technical solution of this embodiment, it is possible to detect whether the first adjusting member 123 is connected to the first mounting position 111 corresponding to the target plate 300, so that the gripping mechanism 100 can subsequently grip the target plate 300 stably and reliably, reducing the error rate of processing and change of the plate 300.

In another embodiment of the present application, as shown in FIGS. 2 to 4, the first detection module 124 of the gripping mechanism 100 provided includes a first trigger 1241 and a plurality of first detectors 1242. The plurality of first detectors 1242 are arranged in one-to-one correspondence with the plurality of first mounting positions 111, the first trigger 1241 is connected to the first adjusting member 123, and the first trigger 1241 is configured to trigger the first detector 1242 corresponding to the first detection position to send the position information of the first detection position.

The first detector 1242 may refer to a component capable of sending a signal. Illustratively, the signal sent by the first detector 1242 may be a current signal, a voltage signal or other signals.

The first trigger 1241 may refer to a component capable of triggering the first detector 1242 to send a signal.

By the plurality of first detectors 1242 being in one-to-one correspondence with the plurality of first mounting positions 111, it can be understood that the number of first detectors 1242 is the same as the number of first mounting positions

111, and each first mounting position 111 is provided with a first detector 1242 corresponding thereto.

The first trigger 1241 is connected to the first adjusting member 123, and the first trigger 1241 is configured to trigger the first detector 1242 corresponding to the first detection position to send the position information of the first detection position. It can be understood that the first trigger 1241 is mounted on the first adjusting member 123: while the first adjusting member 123 is connected to the first detection position, the first trigger 1241 corresponds to the first detector 1242 corresponding to the first detection position, so as to trigger the first detector 1242 to send a signal. Then, through the signal sent by the first detector 1242, the position information of the first detection position can be accurately determined. Illustratively, there are three first detectors 1242, the three first detectors 1242 are arranged and numbered in sequence along the third direction, and the three first mounting positions 111 are numbered in sequence along the third direction. When the first adjusting member 123 is connected to the first one of the first mounting positions 111, the first trigger 1241 is arranged opposite to the first one of the first detectors 1242, so as to trigger the first one of the first detectors 1242 to send a signal. Through the signal sent by the first one of the first detectors 1242, it can be known that the first adjusting member 123 is connected to the first one of the first mounting positions 111. When the first mounting position 111 corresponding to the target plate 300 is the first one of the first mounting positions 111, that is, the mounting position of the first adjusting member 123 is correct, the first jaw 121 and the second jaw 122 can grip the target plate 300, reducing the error rate of the gripping mechanism 100. When the first mounting position 111 corresponding to the target plate 300 is not the first one of the mounting positions, the mounting position of the first adjusting member 123 is wrong, an operator may be reminded by means of an alarm or the like to connect the first adjusting member 123 to the correct first mounting position 111.

By adopting the technical solution of this embodiment, it is possible to detect whether the first adjusting member 123 is connected to the first mounting position 111 corresponding to the target plate 300 by the first trigger 1241 triggering the first detector 1242 corresponding to the first detection position, so that the first detection module 124 has a simple structure and is convenient to process and manufacture.

In another embodiment of the present application, as shown in FIGS. 2 to 4, the first detector 1242 of the gripping mechanism 100 provided includes a proximity switch, and the first trigger 1241 includes a metal trigger configured to trigger the proximity switch.

The proximity switch may refer to a position switch that can be operated without direct mechanical contact with a moving component, and the metal trigger may refer to a metal component that can trigger the proximity switch. When in use, the metal trigger is located in a sensing area of the proximity switch corresponding to the first detection position when the first adjusting member 123 is connected to the first detection position, and the proximity switch can quickly send an electrical signal. The position information of the first detection position can be accurately determined according to the electrical signal.

By adopting the technical solution of this embodiment, the structural form in which the metal trigger triggers the proximity switch is used, and the triggering accuracy is thus high, so that the accuracy of detection of the position information of the first detection position is good, and the structure is simple, facilitating the reduction of the cost of the gripping mechanism 100.

In another embodiment of the present application, as shown in FIGS. 2 to 4, for the gripping mechanism 100 provided, when the second jaw 122 is movably connected to the base body 110, the movable connection structure between the second jaw 122 and the base body 110 is the same as the movable connection structure between the first jaw 121 and the base body 110.

By the movable connection structure between the second jaw 122 and the base body 110 being the same as the movable connection structure between the first jaw 121 and the base body 110, it can be understood that the movable connection method between the first jaw 121 and the base body 110 is the same as the movable connection method between the second jaw 122 and the base body 110.

By adopting the technical solution of this embodiment, the movable connection structure between the second jaw 122 and the base body 110 is the same as the movable connection structure between the first jaw 121 and the base body 110, so that the processing and manufacturing of the gripping mechanism 100 is more convenient.

In one embodiment, the second jaw 122 is connected to a second adjusting member 126, the base body 110 has a plurality of third mounting positions 112, the second adjusting member 126 is connected to different third mounting positions 112, and the spacing between the first jaw 121 and the second jaw 122 is variable, so that plates 300 of different specifications and sizes can be clamped. The first gripping assembly 120 further includes a fourth locking member. The fourth locking member is configured to lock the second adjusting member 126 to different first mounting positions 111, and the fourth locking member includes a third fastener. Each third mounting position 112 is provided with a third connecting hole 1121, the second adjusting member 126 is provided with a fourth connecting hole 1261, and the third fastener passes through the third connecting hole 1121 and the fourth connecting hole 1261, so as to lock the second adjusting member 126 to the third mounting position 112. The third fastener may be a screw, a bolt, a pin or other fasteners. When the third fastener is a screw, the screw passes through the third connecting hole 1121 and is threadedly connected to the fourth connecting hole 1261 to fix the second adjusting member 126 to the base body 110. There are two third mounting positions 112, and the two third mounting positions 112 are arranged in sequence along the third direction. Each third mounting position 112 is provided with four third connecting holes 1121, the second adjusting member 126 is provided with four fourth connecting holes 1261, and the four fourth connecting holes 1261 are connected, in one-to-one correspondence, to the four third connecting holes 1121 of the third mounting position 112 via screws, so as to fix the second adjusting member 126 to the base body 110.

In one embodiment, the first gripping assembly 120 further includes a third detection module 127, and the third mounting position 112 connected to the second adjusting member 126 is a third detection position: the third detection module 127 is configured to obtain position information of the third detection position and send the position information of the third detection position: the third detection module 127 includes a third trigger 1271 and a plurality of third detectors 1272, the plurality of third detectors 1272 are arranged in one-to-one correspondence with the plurality of third mounting positions 112, the third trigger 1271 is connected to the second adjusting member 126, and the third trigger 1271 is configured to trigger the third detector 1272 corresponding to the third detection position to send the position information of the third detection position; and the third detector 1272 includes a proximity switch, and the third trigger 1271 is a metal trigger for triggering the proximity switch. In this way, when the second adjusting member 126 is connected to the third detection position, the third trigger 1271 is located in a sensing area of the third detector 1272 corresponding to the third detection position, so as to trigger the third detector 1272 corresponding to the third detection position to send an electrical signal. The position information of the third detector 1272 can be determined through the electrical signal, and whether the connection position between the second adjusting member 126 and the base body 110 is correct is determined by determining whether the position information of the third detector 1272 is consistent with the position information of the third mounting position 112 corresponding to the target plate 300. Illustratively, there are two third detectors 1272, the two third detectors 1272 are arranged and numbered in sequence along the third direction, and two third mounting positions 112 are numbered in sequence along the third direction. When the second adjusting member 126 is connected to the second one of the third mounting positions 112, the third trigger 1271 is arranged opposite to the second one of the third detectors 1272, so as to trigger the second one of the third detectors 1272 to send a signal. Through the signal sent by the second one of the third detectors 1272, it can be known that the second adjusting member 126 is connected to the second one of the third mounting positions 112. When the third mounting position 112 corresponding to the target plate 300 is the second one of the third mounting positions 112, that is, the mounting position of the second adjusting member 126 is correct, the first jaw 121 and the second jaw 122 can grip the target plate 300, reducing the error rate of the gripping mechanism 100. When the third mounting position 112 corresponding to the target plate 300 is not the second one of the mounting positions, the mounting position of the second adjusting member 126 is wrong, the operator may be reminded by means of an alarm or the like to connect the second adjusting member 126 to the correct third mounting position 112.

In another embodiment of the present application, as shown in FIGS. 2 to 4, the first jaw 121 of the gripping mechanism 100 provided further includes a first driving member 125, the first driving member 125 is connected to the first adjusting member 123 and the first jaw 121, and the first driving member 125 is configured to drive the first jaw 121 to move toward the second jaw 122, so as to clamp a plate 300 located in the clamping zone 113.

The first driving member 125 may refer to a component connected between the first adjusting member 123 and the first jaw 121, and this component can drive the first jaw 121 to move toward the second jaw 122, so as to clamp the plate 300 located in the clamping zone 113. The first driving member 125 may be an air cylinder, a linear module, or other driving members.

By adopting the technical solution of this embodiment, the plate 300 is located in the clamping zone 113, and the first driving member 125 can drive the first jaw 121 to move toward the second jaw 122 so as to clamp the plate 300 and realize the gripping of the plate 300.

In some cases, the first jaw 121 may also be driven directly by the first driving member 125 to approach the second jaw 122, so that the spacing between the first jaw 121 and the second jaw 122 can be adjusted. Such an adjustment method enables a simple structure and convenient processing. However, in the actual use process, this method must take into account the requirements for gripping plates 300 of different specifications and sizes, so that the stroke of the first driving member 125 driving the first jaw 121 may need to be designed longer and the gripping efficiency is low; and the first driving member 125 driving the first jaw 121 to move for a long distance may cause a large displacement error, resulting in that the spacing between the first jaw 121 and the second jaw 122 is not adjusted correctly, and it is difficult to clamp the target plate 300 or there is a problem of damaging the target plate 300 during clamping. Another embodiment of the present application proposes that on the basis that the first driving member 125 drives the first jaw 121 toward the second jaw 122, the first adjusting member 123 is connected to different first mounting positions 111, so that during clamping, the first adjusting member 123 may be connected to the first mounting position 111 corresponding to the target plate 300 first, and the spacing between the first jaw 121 and the second jaw 122 is thus close to the clamping size of the target plate 300. The first driving member 125 drives the first jaw 121 to move to realize the function of clamping the plate 300, that is, the stroke of the first driving member 125 driving the first jaw 121 can be designed shorter, facilitating the improvement of the clamping efficiency and the gripping accuracy. In addition, it is also convenient for the subsequent combination of the first detection module 124 to accurately detect the position of the first jaw 121, further improving the clamping accuracy.

In one embodiment, the connection structure between the second jaw 122 and the second adjusting member 126 may also be the same as the connection structure between the first jaw 121 and the first adjusting member 123, that is, the second jaw 122 may be connected to the second adjusting member 126 via the first driving member 125, such that the first jaw 121 and the second jaw 122 can move relatively to each other at the same time, facilitating the improvement of the clamping efficiency.

In one embodiment, the connection structure between the second jaw 122 and the second adjusting member 126 may alternatively be different from the connection structure between the first jaw 121 and the first adjusting member 123. Illustratively, the second jaw 122 is fixedly connected to the second adjusting member 126. During the clamping of the plate 300, the first jaw 121 pushes the edge portion of the plate 300 to abut against the second jaw 122 under the drive of the first driving member 125, while the second jaw 122 is fixed in position relative to the base body 110, and the second jaw 122 is used as a positioning reference for clamping the plate 300, so that the positioning accuracy of the plate 300 is good, facilitating the subsequent processing and manufacturing.

In one embodiment, a side portion of the first jaw 121 that faces the clamping zone 113 is provided with a first protective member 128 configured to abut against an edge portion of the plate 300; and/or a side portion of the second jaw 122 that faces the clamping zone 113 is provided with a second protective member 129 configured to abut against a further edge portion of the plate 300.

It can be understood that a side portion of the first jaw 121 that faces the clamping zone 113 is provided with a first protective member 128 configured to abut against an edge portion of the plate 300: or a side portion of the second jaw 122 that faces the clamping zone 113 is provided with a second protective member 129 configured to abut against a further edge portion of the plate 300: or a side portion of the first jaw 121 that faces the clamping zone 113 is provided with a first protective member 128 configured to abut against an edge portion of the plate 300, and a side portion of the second jaw 122 that faces the clamping zone 113 is provided with a second protective member 129 configured to abut against a further edge portion of the plate 300.

The first protective member 128 may be a component with a hardness range of 20 HD-100 HD. The first protective member 128 is located on the side of the first jaw 121 that faces the clamping zone 113. The first protective member 128 may refer to a component made of a hard plastic. During the clamping of the plate 300, the first protective member 128 abuts against the edge portion of the plate 300, and the hardness of the first protective member 128 is limited between 20 HD and 100 HD, so that the first protective member 128 has a certain hardness and can stably and reliably abut against the plate 300, the positioning accuracy of the plate 300 is good, but the plate 300 will not be damaged due to the too hard first protective member. The material of the first protective member 128 may be a hard plastic material such as plastic steel.

The second protective member 129 may be a component with a hardness range of 20 HD-100 HD. The second protective member 129 is located on the side of the second jaw 122 that faces the clamping zone 113. The second protective member 129 may refer to a component made of a hard plastic. During the clamping of the plate 300, the second protective member 129 abuts against the edge portion of the plate 300, and the hardness of the second protective member 129 is limited between 20 HD and 100 HD, so that the second protective member 129 has a certain hardness and can stably and reliably abut against the plate 300, the positioning accuracy of the plate 300 is good, but the plate 300 will not be damaged due to the too hard second protective member. The material of the second protective member 129 may be a hard plastic material such as plastic steel.

The aforementioned hardness value may be obtained by measuring with a Shore D durometer.

By adopting the technical solution of the embodiment of the present application, during the clamping of the plate 300, the protective member (the first protective member 128 and/or the second protective member 129) abuts against the edge portion of the plate 300, and can stably and reliably abut against the plate 300 to obtain good accuracy in positioning the plate 300, but it will not be too hard to damage the plate 300. The hardness of the protective member (the first protective member 128 and/or the second protective member 129) is set within the aforementioned range, so that the protective member will not be damaged during abutment against the plate 300, nor will it be too hard to damage the plate 300.

Further, in a specific application, the hardness of the first protective member 128 is 20 HD, 30 HD, 40 HD, 50 HD, 60 HD, 70 HD, 80 HD, 90 HD or 100 HD, which can be selected according to specific requirements, and is not limited here. Similarly, the hardness of the second protective member 129 may be 20 HD, 30 HD, 40 HD, 50 HD, 60 HD, 70 HD, 80 HD, 90 HD or 100 HD, which can be selected according to specific requirements.

In one embodiment, in a direction away from the base body 110, the spacing between the first protective member 128 and the second protective member 129 becomes larger, so as to facilitate the entrance of the plate 300 into the clamping zone 113 for clamping same. Illustratively, a side portion of the first protective member 128 that faces the clamping zone 113 is provided with a first inclined surface 1281, and in the direction away from the base body 110, the first inclined surface 1281 extends obliquely away from the second jaw 122; and a side portion of the second protective member 129 that faces the clamping zone 113 is provided with a second inclined surface 1291, and in the direction away from the base body 110, the second inclined surface 1291 extends obliquely away from the first jaw 121. When the plate 300 enters the clamping zone 113, the two opposite side edges of the plate 300 are respectively guided by the first inclined surface 1281 and the second inclined surface 1291, so that the plate 300 enters the clamping zone 113 more easily and is clamped, so as to be gripped.

In another embodiment of the present application, as shown in FIGS. 2 to 4, the gripping mechanism 100 provided further includes a second gripping assembly 130. The second gripping assembly 130 includes a third jaw 131 and a fourth jaw 132: the third jaw 131 is arranged on one of two further opposite sides of the clamping zone 113, and the fourth jaw 132 is arranged on the other side; and at least one of the third jaw 131 and the fourth jaw 132 is movably connected to the base body 110 to adjust a spacing between the third jaw 131 and the fourth jaw 132.

The second gripping assembly 130 may refer to a component configured to clamp the plate 300 from the two further opposite sides of the clamping zone 113. Illustratively, as shown in FIG. 2, the first gripping assembly 120 performs clamping from the left and right sides of the clamping zone 113, and the second gripping assembly performs clamping from the front and rear sides of the clamping zone 113.

The third jaw 131 may refer to a component of the first gripping assembly 120 that is located on one of the two further opposite sides of the clamping zone 113, and the fourth jaw 132 may refer to a component of the first gripping assembly 120 that is arranged opposite to the third jaw 131.

At least one of the third jaw 131 and the fourth jaw 132 is movably connected to the base body 110, such that a spacing between the third jaw 131 and the fourth jaw 132 can be adjusted. It can be understood that it is possible that the third jaw 131 is movably connected to the base body 110, and the spacing between the third jaw 131 and the fourth jaw 132 can be changed by adjusting the third jaw 131. It is also possible that the fourth jaw 132 is movably connected to the base body 110, and the spacing between the third jaw 131 and the fourth jaw 132 can be changed by adjusting the fourth jaw 132. it is also possible that the third jaw 131 and the fourth jaw 132 are both movably connected to the base body 110, and the spacing between the third jaw 131 and the fourth jaw 132 can be changed by adjusting the third jaw 131 and the fourth jaw 132.

By adopting the technical solution of this embodiment, the first jaw 121 and the second jaw 122 clamp the plate from the two opposite sides of the plate 300, and the third jaw 131 and the fourth jaw 132 clamp the plate 300 from two further opposite sides of the plate 300. In this way, there are many clamping points for the plate 300, and the stability of clamping and gripping is good. In addition, the spacing between the third jaw 131 and the fourth jaw 132 can be adjusted, so that the third jaw 131 and the fourth jaw 132 can relatively approach each other to realize the gripping of the plate 300, and it is also possible to meet the requirements for gripping plates 300 of more specifications and sizes.

In another embodiment of the present application, as shown in FIGS. 2 to 4, the second gripping assembly 130 of the gripping mechanism 100 provided further includes a second driving member 133. The second driving member 133 is connected to the third jaw 131 and the base body 110, and the second driving member 133 is configured to drive the third jaw 131 to move, so as to adjust the spacing between the third jaw 131 and the fourth jaw 132.

The second driving member 133 may refer to a component configured to drive the third jaw 131 to move, the second driving member 133 is connected between the third jaw 131 and the base body 110, and the second driving member 133 drives the third jaw 131 to approach or move away from the fourth jaw 132 to change the spacing between the third jaw 131 and the fourth jaw 132. Illustratively, the second driving member 133 may be an air cylinder, a linear module, or other driving components.

By adopting the technical solution of this embodiment, the structure in which the second driving member 133 drives the third jaw 131 to move is simple and is convenient to manufacture.

In another embodiment of the present application, as shown in FIGS. 2 to 4, when the fourth jaw 132 of the gripping mechanism 100 provided is movably connected to the base body 110, the second gripping assembly 130 further includes a third driving member. The third driving member is connected to the fourth jaw 132 and the base body 110, and the third driving member is configured to drive the fourth jaw 132 to move to adjust the spacing between the third jaw 131 and the fourth jaw 132.

The third driving member may refer to a component configured to drive the fourth jaw 132 to move, the third driving member is connected between the fourth jaw 132 and the base body 110, and the third driving member drives the fourth jaw 132 to approach or move away from the third jaw 131 to change the spacing between the third jaw 131 and the fourth jaw 132. Illustratively, the third driving member may be an air cylinder, a linear module, or other driving components.

By adopting the technical solution of this embodiment, the structure in which the third driving member drives the fourth jaw 132 to move is simple and is convenient to manufacture.

In another embodiment, the fourth jaw 132 may alternatively be fixedly connected to the base body 110. In this design, during the clamping, the fourth jaw 132 is fixed in position relative to the base body 110, and the fourth jaw 132 is used as a positioning reference for clamping the plate 300, so that the positioning accuracy of the plate 300 is good, facilitating the subsequent processing and manufacturing.

In one embodiment, a side portion of the third jaw 131 that faces the clamping zone 113 is provided with a third protective member 134 configured to abut against an edge portion of the plate 300; and/or a side portion of the fourth jaw 132 that faces the clamping zone 113 is provided with a fourth protective member 135 configured to abut against a further edge portion of the plate 300.

It can be understood that a side portion of the third jaw 131 that faces the clamping zone 113 is provided with a third protective member 134 configured to abut against an edge portion of the plate 300; or a side portion of the fourth jaw 132 that faces the clamping zone 113 is provided with a fourth protective member 135 configured to abut against a further edge portion of the plate 300; or a side portion of the third jaw 131 that faces the clamping zone 113 is provided with a third protective member 134 configured to abut against an edge portion of the plate 300, and a side portion of the fourth jaw 132 that faces the clamping zone 113 is provided with a fourth protective member 135 configured to abut against a further edge portion of the plate 300.

The third protective member 134 may be a component with a hardness range of 20 HD-100 HD. The third protective member 134 is located on the side of the third jaw 131 that faces the clamping zone 113. The third protective member 134 may refer to a component made of a hard plastic. During the clamping of the plate 300, the third protective member 134 abuts against the edge portion of the plate 300, and the hardness of the third protective member 134 is limited between 20 HD and 100 HD, so that the third protective member 134 has a certain hardness and can stably and reliably abut against the plate 300, the positioning accuracy of the plate 300 is good, but the plate 300 will not be damaged due to the too hard third protective member. The material of the third protective member 134 may be a hard plastic material such as plastic steel.

The fourth protective member 135 may be a component with a hardness range of 20 HD-100 HD. The fourth protective member 135 is located on the side of the fourth jaw 132 that faces the clamping zone 113. The fourth protective member 135 may refer to a component made of a hard plastic. During the clamping of the plate 300, the fourth protective member 135 abuts against the edge portion of the plate 300, and the hardness of the fourth protective member 135 is limited between 20 HD and 100 HD, so that the fourth protective member 135 has a certain hardness and can stably and reliably abut against the plate 300, the positioning accuracy of the plate 300 is good, but the plate 300 will not be damaged due to the too hard fourth protective member. The material of the fourth protective member 135 can be hard plastic materials such as plastic steel.

The aforementioned hardness value may be obtained by measuring with a Shore D durometer.

By adopting the technical solution of the embodiment of the present application, during the clamping of the plate 300, the protective member (the third protective member 134 and/or the fourth protective member 135) abuts against the edge portion of the plate 300, and can stably and reliably abut against the plate 300 to obtain good accuracy in positioning the plate 300, but it will not be too hard to damage the plate 300. The hardness of the protective member (the third protective member 134 and/or the fourth protective member 135) is set within the aforementioned range, so that the protective member will not be damaged during abutment against the plate 300, nor will it be too hard to damage the plate 300.

Further, in a specific application, the hardness of the third protective member 134 is 20 HD, 30 HD, 40 HD, 50 HD, 60 HD, 70 HD, 80 HD, 90 HD or 100 HD, which can be selected according to specific requirements, and is not limited here. Similarly, the hardness of the fourth protective member 135 may be 20 HD, 30 HD, 40 HD, 50 HD, 60 HD, 70 HD, 80 HD, 90 HD or 100 HD, which can be selected according to specific requirements.

In one embodiment, in a direction away from the base body 110, the spacing between the third protective member 134 and the fourth protective member 135 becomes larger, so as to facilitate the entrance of the plate 300 into the clamping zone 113 for clamping same. Illustratively, a side portion of the third protective member 134 that faces the clamping zone 113 is provided with a third inclined surface 1341, and in the direction away from the base body 110, the third inclined surface 1341 extends obliquely away from the fourth jaw 132; and a side portion of the fourth protective member 135 that faces the clamping zone 113 is provided with a fourth inclined surface 1351, and in the direction away from the base body 110, the fourth inclined surface 1351 extends obliquely away from the third jaw 131. When the plate 300 enters the clamping zone 113, the two opposite side edges of the plate 300 are respectively guided by the third inclined surface 1341 and the fourth inclined surface

1351, so that the plate 300 enters the clamping zone 113 more easily and is clamped, so as to be gripped.

In another embodiment, the movable connection method between the third jaw 131 and the base body 110 may also adopt the movable connection method between the first jaw 121 and the base body 110, that is, the third jaw 131 is connected to different positions of the base body 110, so as to adjust the spacing between the third jaw 131 and the fourth jaw 132, and a detection module may also be used to detect position information of the connection between the third jaw 131 and the base body 110, so as to obtain the spacing between the third jaw 131 and the fourth jaw 132; and/or the movable connection method between the fourth jaw 132 and the base body 110 may also adopt the movable connection method between the first jaw 121 and the base body 110, that is, the fourth jaw 132 is connected to different positions of the base body 110, so as to adjust the spacing between the third jaw 131 and the fourth jaw 132, and a detection module may also be used to detect position information of the connection between the fourth jaw 132 and the base body 110, so as to obtain the spacing between the third jaw 131 and the fourth jaw 132. These methods can be applied to plate 300 having larger dimensions in two directions among the plates 300 of different specifications and sizes. Among the side plates of different specifications and sizes of the battery, the lengths of the side plates of the battery have a large difference, and the widths of the side plates of the battery have a small difference, so that the first jaw 121 and the second jaw 122 are used to clamp the side plate of the battery in the length direction of the side plate of the battery, the third jaw 131 and the fourth jaw 132 are used to clamp the side plate of the battery in the length direction of the side plate of the battery, and the first detection module 124 and the second detection module 2224 are used to obtain the spacing between the first jaw 121 and the second jaw 122, so that the specification information of the side plate of the battery that can be clamped by the gripping mechanism 100 can be obtained.

In another embodiment of the present application, as shown in FIG. 1, the gripping mechanism 100 provided further includes a moving assembly 140. The moving assembly 140 is connected to the base body 110, and the moving assembly 140 is configured to drive the base body 110 to move.

The moving assembly 140 may refer to a component capable of driving the base body 110 to move, and the moving assembly 140 may be a cylinder, a linear module, a manipulator or other components.

By adopting the technical solution of this embodiment, the moving assembly 140 drives the base body 110, the first gripping assembly 120 connected to the base body 110, and other components to move, and the moving assembly 140 can move the base body 110, the first gripping assembly 120, and other components to a bin mechanism 200 for storing the plate 300 for gripping. After the gripping is completed, the moving assembly 140 moves the plate 300 to a subsequent processing apparatus for processing, so as to realize the gripping and delivering of the plate 300.

In another embodiment of the present application, a side portion of the base body 110 of the gripping mechanism 100 provided that faces the clamping zone 113 is provided with a suction member 150 configured to suction the plate 300.

The suction member 150 may refer to a component capable of suctioning plate 300. Vacuum suction, adhesive attachment, etc. may be used between the suction member 150 and the plate 300 for suction. For example, the suction member 150 may be a suction cup or a component having a surface covered with an adhesive layer.

By adopting the technical solution of this embodiment, the suction member 150 suctions and fixes the plate 300 in the clamping zone 113 first, then the clamping of the plate 300 by the first jaw 121 and the second jaw 122 is more convenient and fast, and the clamping is more stable and reliable. In addition, after being clamped by the first jaw 121 and the second jaw 122, the plate 300 is suctioned by the suction member 150, so that the risk of the plate 300 falling between the first jaw 121 and the second jaw 122 can be reduced, facilitating the improvement of the yield rate.

In one embodiment, there are a plurality of suction members 150, and the plurality of suction members 150 are evenly distributed at intervals in the third direction between the first jaw 121 and the second jaw 122, and the clamping and the suctioning of the plate 300 are more stable and reliable.

In another embodiment of the present application, as shown in FIGS. 2 to 4, the suction member 150 of the gripping mechanism 100 provided includes a connecting portion 151 and an elastic portion 152. The connecting portion 151 is connected to the base body 110 and the elastic portion 152, the elastic portion 152 is located at a side portion of the connecting portion 151 that faces the clamping zone 113, and a surface of the elastic portion 152 that faces the clamping zone 113 is provided with a vacuum suction hole 1521 configured to suction the plate 300.

The elastic portion 152 may refer to a part of the suction member 150 that is made of an elastic material. The elastic material may be silicone, rubber or the like.

The connecting portion 151 may refer to a part of the suction member 150 that is connected to the base body 110 and the elastic portion 152. It should be noted that the connecting portion 151 is made of a hard material, such as metal, plastic steel or other materials, so as to provide a good support function for the elastic portion 152 and the plate 300.

By the elastic portion 152 being located at the side portion of the connecting portion 151 that faces the clamping zone 113, it can be understood that the elastic portion 152 is closer to the clamping zone 113 than the connecting portion 151, and when the plate 300 enters the clamping zone 113, the plate 300 first comes into contact with the elastic portion 152, so that the plate 300 and the suction member 150 are in elastic contact with each other, facilitating the reduction of the damage to the plate 300.

By a surface of the elastic portion 152 that faces the clamping zone 113 being provided with a vacuum suction hole 1521 configured to suction the plate 300, it can be understood that a surface of the elastic portion 152 that faces away from the connecting portion 151 is provided with a vacuum suction hole 1521, so that after the plate 300 enters the clamping zone 113, a negative pressure is formed in the vacuum suction hole 1521, so as to suction and fix the plate 300.

By adopting the technical solution of this embodiment, the design of the elastic portion 152 enables an elastic contact between the plate 300 and the suction member 150, facilitating the reduction of the damage to the plate 300; moreover, the plate 300 is suctioned by means of the vacuum suction hole 1521, so that the structure is simple and is convenient to manufacture.

In one embodiment, the vacuum suction hole 1521 may be connected to a vacuum generator via a pipeline, and the vacuum generator is used to draw a vacuum, such that a negative pressure is formed in the vacuum suction hole 1521 to complete the vacuum suction of the plate 300. There may be a plurality of vacuum suction holes 1521, and the plurality of vacuum suction holes 1521 may be arranged in the form of a ring or in a matrix.

In actual use, due to the elasticity of the elastic portion 152, the plate 300 will squeeze and deform the elastic portion 152 when the plate 300 is suctioned by means of the vacuum suction hole 1521, resulting in that the position of the plate 300 is different after each gripping, that is, the positioning accuracy of the plate 300 is not high.

In another embodiment of the present application, as shown in FIGS. 2 to 4, the side portion of the base body 110 of the gripping mechanism 100 provided that faces the clamping zone 113 is further provided with a limiting member 160, and a side surface of the limiting member 160 that faces the clamping zone 113 is configured to abut against the plate 300.

The limiting member 160 may refer to a component mounted on the base body 110 and facing the clamping zone 113, and the side surface of the limiting member 160 that faces the clamping zone 113 can abut against the plate 300, thereby preventing the plate 300 from continuing to move toward the base body 110, and thus realizing the positioning of the plate 300.

By adopting the technical means of this embodiment, it is possible that during the suction of the plate 300 to the elastic portion 152 by means of the vacuum suction hole 1521, the plate 300 may abut against the side surface of the limiting member 160 that faces the clamping zone 113, so as to prevent the plate 300 from continuing to squeeze the elastic portion 152, and reduce the risk of excessive squeezing of the elastic portion 152; moreover, it is also possible to realize the accurate positioning of the plate 300 and improve the accuracy of subsequent operations.

In one embodiment, suction members 150 and limiting members 160 are arranged alternately along the third direction, so as to improve the limiting effect of the plate 300, facilitating the improvement of the positioning accuracy of the plate 300.

In another embodiment of the present application, as shown in FIGS. 2 to 4, the gripping mechanism 100 provided further includes a distance detector 170. The distance detector 170 is configured to detect a distance value between the plate 300 and the distance detector 170; when the distance value is within a preset range, the plate 300 is located in the clamping zone 113; and the distance detector 170 is further configured to send a gripping signal for gripping the plate 300.

The distance detector 170 may refer to a sensor capable of measuring the distance, and when the distance value detected by the distance detector 170 is within a preset range, the plate 300 is located in the clamping zone 113. In this case, the distance detector 170 sends a gripping signal, and the gripping mechanism 100 can grip the plate 300 after receiving the gripping signal. The distance detector 170 may be a distance sensor, for example, a laser distance sensor, an ultrasonic distance sensor, an infrared distance measuring sensor, etc.

By adopting the technical solution of this embodiment, the distance detector 170 is used to determine whether there is a plate 300 in the clamping zone 113, so that the risk of the gripping mechanism 100 gripping nothing is reduced, and it is also possible to enable the gripping mechanism 100 to grip the plate 300 stably and reliably.

In another embodiment of the present application, as shown in FIGS. 2 to 4, the gripping mechanism 100 provided further includes a sensing member 180. The sensing member 180 is configured to sense the plate 300 in the clamping zone 113.

The sensing member 180 may refer to a component capable of sensing whether there is a plate 300 in the clamping zone 113, and the sensing member 180 may be a photoelectric sensor, an ultrasonic sensor or other components. After the gripping mechanism 100 grips the plate 300, the sensing member 180 senses whether there is a plate 300 in the clamping zone 113. If there is a plate 300 in the clamping zone 113, the gripping mechanism 100 grips the plate 300 successfully. If there is no plate 300 in the clamping zone 113, the gripping mechanism 100 fails to grip the plate 300, or the plate 300 falls from the gripping mechanism 100, and the gripping mechanism 100 needs to grip the plate 300 again.

By adopting the technical solution of this embodiment, it is possible to determine whether the gripping mechanism 100 has successfully griped the plate 300 by means of the sensing member 180, and it is also possible to detect whether the plate 300 has fallen during the movement of the plate 300.

Figure 5:
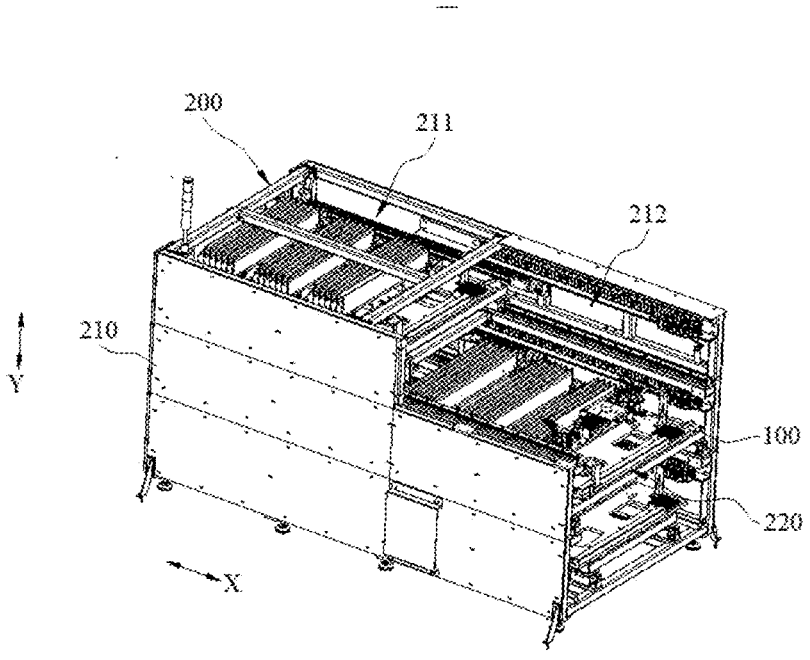
FIG. 5 is a schematic structural view of a loading device provided in an embodiment of the present application when viewed from one perspective.

In another embodiment of the present application, as shown in FIG. 5, a loading device 10 is provided, including a gripping mechanism 100 of the above embodiments.

Figure 6:
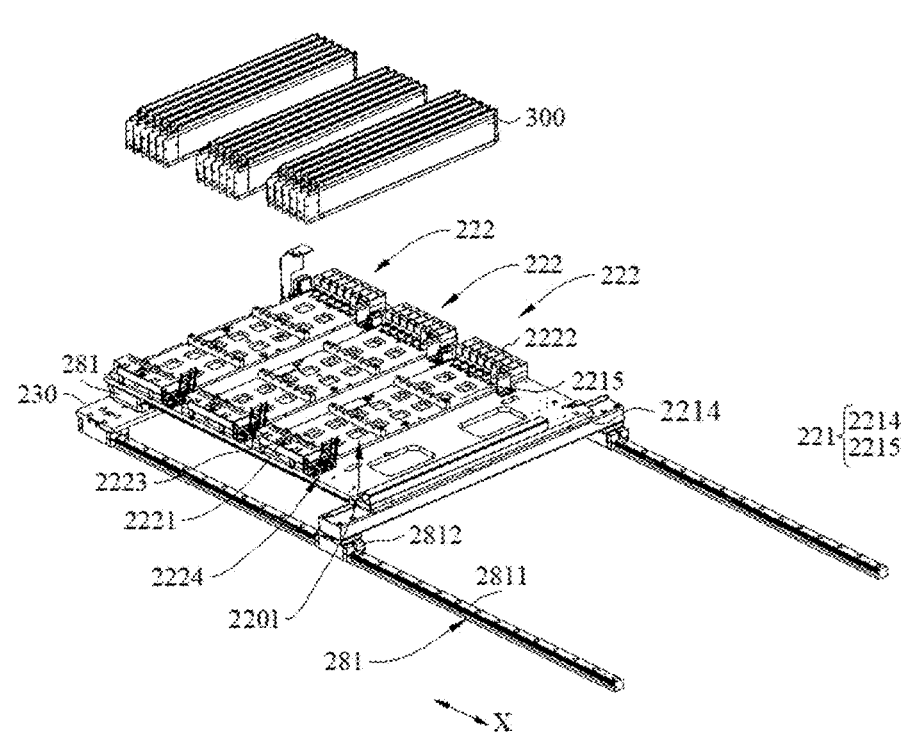
FIG. 6 is a schematic structural diagram of a storage assembly shown in FIG. 5.

In another embodiment of the present application, as shown in FIGS. 5 and 6, the loading device 10 provided further includes a bin mechanism 200 configured to store plates 300. The bin mechanism 200 includes a rack 210 and a storage assembly 220, the storage assembly 220 is connected to the rack 210, and the storage assembly 220 can store the plates 300 of different specifications and sizes.

The bin mechanism 200 may refer to a mechanism for storing the plates 300. The bin mechanism 200 includes a rack 210 and a storage assembly 220. The rack 210 may refer to a base body 110 on which the storage assembly 220 is mounted, and which functions to support the storage assembly 220. The storage assembly 220 can store plates 300 of different specifications and sizes.

Through the technical solution of this embodiment, the storage assembly 220 can store plates 300 of different specifications and sizes, so that it is possible to increase the general scope of the bin mechanism 200; moreover, the storage assembly can also be adapted to the gripping mechanism 100 that can grip plates 300 of different specifications and sizes, facilitating the improvement of the production efficiency.

In another embodiment of the present application, as shown in FIGS. 5 and 6, the storage assembly 220 of the loading device 10 provided includes a support member 221 and a storage module 222. The support member 221 is connected to the rack 210; the storage module 222 includes a first storage member 2221 and a second storage member 2222 arranged on the support member 221, and a storage zone 2201 for storing the plates 300 is formed between the first storage member 2221 and the second storage member 2222; and at least one of the first storage member 2221 and the second storage member 2222 is movably connected to the support member 221, such that a spacing between the first storage member 2221 and the second storage member 2222 can be adjusted.

The support member 221 may refer to a base body 110 on which the storage module 222 is mounted, and which functions to support the storage assembly 220; moreover, the support member 221 may also function to connect the rack

210 and the storage module 222. The support member 221 may have a plate-like structure, a frame-like structure or other structures.

The storage module 222 may refer to a component configured to store the plates 300. The storage module 222 includes a first storage member 2221 and a second storage member 2222. The first storage member 2221 and the second storage member 2222 may refer to two components configured to enclose the storage zone 2201. The storage zone 2201 may refer to an area for storing the plate 300. Illustratively, the first storage member 2221 and the second storage member 2222 are arranged at intervals on the support member 221, and an area between the first storage member 2221 and the second storage member 2222 forms the storage zone 2201.

By at least one of the first storage member 2221 and the second storage member 2222 being movably connected to the support member 221, such that a spacing between the first storage member 2221 and the second storage member 2222 can be adjusted, it can be understood that the first storage member 2221 is movably connected to the support member 221, that is, the first storage member 2221 can move relative to the support member 221, so as to change the spacing between the first storage member 2221 and the second storage member 2222; or the second storage member 2222 is movably connected to the support member 221, that is, the second storage member 2222 can move relative to the support member 221, so as to change the spacing between the first storage member 2221 and the second storage member 2222: or the first storage member 2221 and the second storage member 2222 are both movably connected to the support member 221, that is, the first storage member 2221 and the second storage member 2222 both can move relative to the support member 221, so as to change the spacing between the first storage member 2221 and the second storage member 2222.

By adopting the technical solution of this embodiment, the spacing between the first storage member 2221 and the second storage member 2222 can be adjusted, that is, the size of the storage zone 2201 can be adjusted, so that it is possible to meet the requirements for placing plates 300 of different specifications and sizes, so as to enable the bin mechanism 200 to be compatible with plates 300 of different specifications and sizes.

In one embodiment, the first storage member 2221 is movably connected to the support member 221, and the second storage member 2222 is fixedly connected to the support member 221, so that the spacing between the first storage member 2221 and the second storage member 2222 can be adjusted by adjusting the first storage member 2221: or the second storage member 2222 is movably connected to the support member 221, and the first storage member 2221 is fixedly connected to the support member 221, so that the spacing between the first storage member 2221 and the second storage member 2222 can be adjusted by adjusting the second storage member 2222. In this way, the component located on one side of the storage zone 2201 can be adjusted, and the structure configured in this way is simple, and the adjustment operation is simple.

In one embodiment, the first storage member 2221 and the second storage member 2222 are both movably connected to the support member 221, so that the components located on two opposite sides of the storage zone 2201 can be adjusted, and the adjustment operation is more flexible in such a configuration.

In one embodiment, the first storage member 2221 and the second storage member 2222 may be respectively provided with a first insertion groove 22211 and a second insertion groove 22221, the plate 300 may be placed vertically, and two ends of the plate 300 are respectively inserted into the first insertion groove 22211 and the second insertion groove 22221, so as to realize the positioning of the plate 300 in the storage zone 2201 to facilitate the subsequent gripping by the gripping mechanism 100. In another embodiment, the first storage assembly 220 may be provided with no first insertion groove 22211, and the second storage assembly may be provided with no second insertion groove 22221, and the plate 300 is laid flat on the storage zone 2201 or vertically placed in the storage zone 2201, which is specifically set according to the storage requirements for the actual plate 300, and is not limited here.

In one embodiment, the support member 221 is provided with an intermediate member 2225. The intermediate member 2225 is located between the first storage member 2221 and the second storage member 2222, the intermediate member 2225 is provided with a support groove 22251, and the plate member 300 is vertically placed in the support groove 22251, so as to support a middle part of the plate 300, improving the stability and reliability of the vertical placement of the plate 300.

In one embodiment, one support member 221 is provided with a plurality of storage modules 222, so that one storage assembly 220 can meet the requirements for storing plates 300 of multiple specifications and sizes, and it is also conducive to improving the storage capacity of plates 300 in the bin mechanism 200. Illustratively, the support member 221 includes a first support plate 2214 and a plurality of second support plates 2215 arranged at the first support plate 2214. The plurality of storage modules 222 are arranged on the plurality of second support plates 2215 in one-to-one correspondence, so that a modular mounting structure can be formed for easy assembly.

Figure 7:
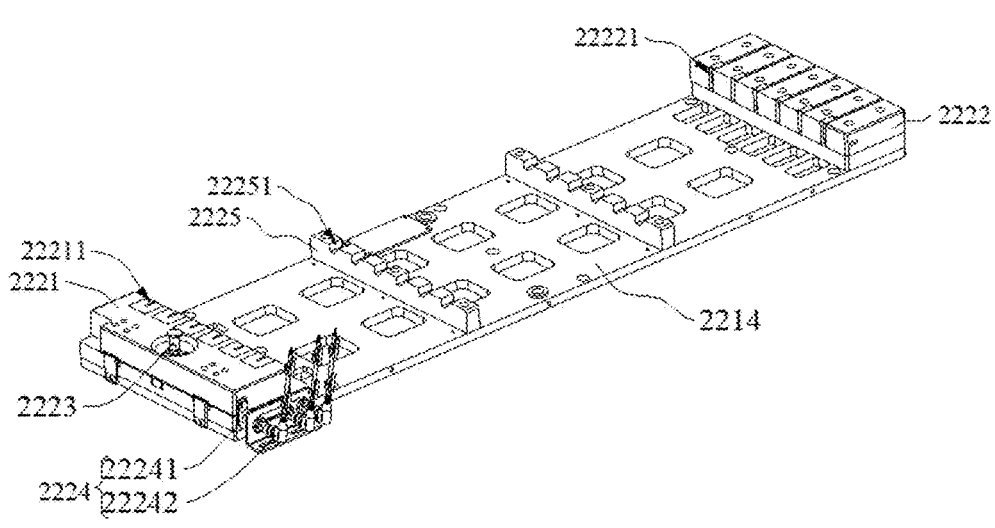
FIG. 7 is a schematic structural diagram of a storage module shown FIG. 6.
Figure 8:
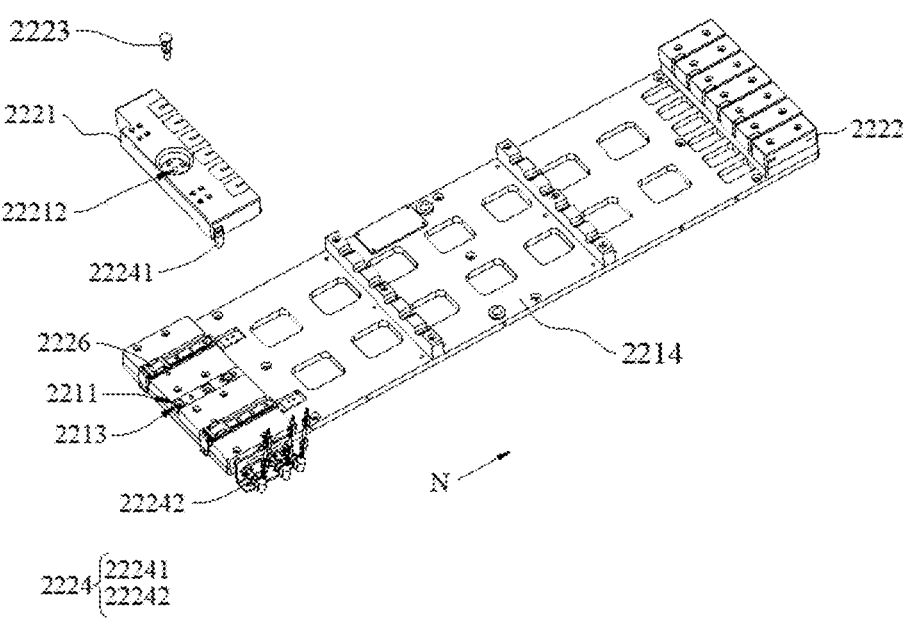
FIG. 8 is an exploded schematic view of the storage module shown in FIG. 7.

In another embodiment of the present application, as shown in FIGS. 7 and 8, for the loading device 10 provided, on the basis that the first storage member 2221 is movably connected to the base body 110, the support member 221 is configured with a plurality of second mounting positions 2211, and the first storage member 2221 is connected to different second mounting positions 2211 such that the spacing between the first storage member 2221 and the second storage member 2222 is variable.

The second mounting position 2211 may refer to a position of the support member 221 that is configured to be connected to the first storage member 2221; and the plurality of second mounting positions 2211 may refer to two, three, four or more positions formed on the base body 110 for allowing the first adjusting member 123 to be mounted. Illustratively, there are three second mounting positions 2211 (reference may be made to the positions indicated by the dotted boxes shown in FIG. 8), and the three second mounting positions 2211 are arranged along a fourth direction (reference may be made to the direction indicated by arrow N shown in FIG. 8). The fourth direction is a direction from the first storage member 2221 to the second storage member 2222, the first storage member 2221 is connected to different second mounting positions 2211, and the spacing between the first storage member 2221 and the second storage member 2222 is variable.

By adopting the technical solution of this embodiment, when the first storage member 2221 is mounted in the second mounting position 2211, the spacing between the first storage member 2221 and the second storage member 2222 is relatively fixed, so that one second mounting position 2211 can correspond to a plate 300 of one specification and size. Then, in a loading process of the bin mechanism 200, the first storage member 2221 can be quickly connected to the second mounting position 2211 corresponding to the plate 300 to be loaded, and the loading operation is convenient. In addition, during the gripping of the plate 300, the storage zone 2201 of the target plate 300 can also be quickly found by means of the second mounting position 2211.

In another embodiment of the present application, as shown in FIGS. 7 and 8, the storage module 222 of the loading device 10 provided further includes a second locking member 2223, and the second locking member 2223 is configured to lock the first storage member 2221 to different second mounting positions 2211.

The second locking member 2223 may refer to a component capable of locking the first storage member 2221 to different second mounting positions 2211. The first storage member 2221 is fixed to the second mounting position 2211 of the support member 221 via the second locking member 2223. Moreover, the second locking member 2223 can also release the locking between the first storage member 2221 and the second mounting position 2211, and then the first storage member 2221 is locked to another second mounting position 2211 via the second locking member 2223, so that the adjustment of the spacing between the first storage member 2221 and the second storage member 2222 is realized, so as to be compatible with plates 300 of different specifications and sizes.

By adopting the technical solution of this embodiment, the first storage member 2221 can be connected to different second mounting positions 2211 by operating the second locking member 2223, so as to change the spacing between the first storage member 2221 and the second storage member 2222, so that the adjustment operation is simple and convenient.

In one embodiment, the second locking member 2223 includes a second fastener, each of the second mounting positions 2211 is provided with a fifth connecting hole 2213, the first storage member 2221 is provided with a sixth connecting hole 22212, and the second fasteners passes through the fifth connecting hole 2213 and the sixth connecting hole 22212 to lock the first storage member 2221 to the second mounting position 2211.

The second fastener may refer to a component configured to securely connect the first storage member 2221 to the support member 221. The second fastener may be a bolt, a screw, a pin or other components.

The fifth connecting hole 2213 may refer to a hole structure provided in the second mounting position 2211, the sixth connecting hole 22212 may refer to a hole structure provided in the first storage member 2221, and the second fastener is passed through the fifth connecting hole 2213 and the sixth connecting hole 22212 and locks the first storage member 2221 to the second mounting position 2211. For example, the second fastener is a pin, which passes through the sixth connecting hole 22212 and the fifth connecting hole 2213, so as to fixedly connect the first storage member 2221 and the second mounting position 2211 together. During the adjustment, the pin is pulled out from the fifth connecting hole 2213 and the sixth connecting hole 22212, and then the pin is inserted into the sixth connecting hole 22212 and the fifth connecting hole 2213 of another second mounting position 2211, so that the spacing between the first jaw 121 and the second jaw 122 can be adjusted, and the adjustment operation is simple, convenient and fast.

By adopting the technical solution of this embodiment, the locking between the first storage member 2221 and the second mounting position 2211 takes the form of the second fastener, the structure is simple, and the adjustment operation is convenient and fast.

In one embodiment, the first storage member 2221 and the support member 221 are slidably connected to each other via a first slide rail 2226, and the first slide rail 2226 extends in the fourth direction, so as to provide a guidance for the movement of the first storage member 2221 relative to the support member 221, and also facilitate the alignment of the fifth connecting hole 2213 and the sixth connecting hole 22212, and facilitate the mounting of the second fastener, so that the operation of adjusting the spacing between the first storage member 2221 and the second storage member 2222 is simpler. There may be a plurality of first slide rails 2226. For example, there are two first slide rails 2226, and the two first slide rails 2226 are located on two opposite sides of the second mounting position 2211. Such a configuration has a better guiding effect on the movement of the first storage member 2221.

In another embodiment of the present application, as shown in FIGS. 7 and 8, the storage module 222 of the loading device 10 provided further includes a second detection module 2224, and the second mounting position 2211 connected to the first storage member 2221 is a second detection position; and the second detection module 2224 is configured to obtain position information of the second detection position and send the position information of the second detection position.

The second detection position may refer to the second mounting position 2211 that is connected to the first storage member 2221.

It may mean that the second detection module 2224 can obtain the position information of the second detection position and send the position information of the second detection position. It can be understood that the second detection module 2224 can obtain the position information of the second mounting position 2211 that is connected to the first storage member 2221, i.e. the position information of the second detection position, and send the position information. Then, through the position information, the specification information of the plate 300 corresponding to the second detection position can be known. In practical applications, whether the position information sent by the second detection module 2224 is consistent with the position information of the second mounting position 2211 corresponding to the target plate 300 can be determined, so as to determine whether the target plate 300 is stored on the storage module 222. If the position information sent by the second detection module 2224 is inconsistent with the position information of the second mounting position 2211 corresponding to the target plate 300, the target plate 300 is not stored on the storage module 222. if the position information sent by the second detection module 2224 is consistent with the position information of the second mounting position 2211 corresponding to the target plate 300, the target plate 300 is stored on the storage module 222, facilitating the subsequent accurate gripping of the plate 300.

By adopting the technical solution of this embodiment, it is possible to detect whether the storage module 222 stores a target, so that the gripping mechanism 100 can subsequently the target plate 300 accurately, reducing the error rate of processing and change of the plate 300.

In another embodiment of the present application, as shown in FIGS. 7 and 8, the second detection module 2224 of the loading device 10 provided includes a second trigger 22241 and a plurality of second detectors 22242. The plurality of second detectors 22242 are arranged in one-to-one correspondence with the plurality of second mounting positions 2211, the second trigger 22241 is connected to the first storage member 2221, and the second trigger 22241 is configured to trigger the second detector 22242 corresponding to the second detection position to send the position information of the second detection position.

The second detector 22242 may refer to a component capable of sending a signal. Illustratively, the signal sent by the second detector 22242 may be a current signal, a voltage signal or other signals.

The second trigger 22241 may refer to a component capable of triggering the second detector 22242 to send a signal.

By the plurality of second detectors 22242 being in one-to-one correspondence with the plurality of second mounting positions 2211, it can be understood that the number of second detectors 22242 is the same as the number of second mounting positions 2211, and each second mounting position 2211 is provided with a second detector 22242 corresponding thereto.

The second trigger 22241 is connected to the first storage member 2221, and the second trigger 22241 is configured to trigger the second detector 22242 corresponding to the second detection position to send the position information of the second detection position. It can be understood that the second trigger 22241 is mounted on the first storage member 2221: while the first storage member 2221 is connected to the second detection position, the second trigger 22241 corresponds to the second detector 22242 corresponding to the second detection position, so as to trigger the second detector 22242 to send a signal. Then, through the signal sent by the second detector 22242, the position information of the second detection position can be accurately determined. Illustratively, there are three second detectors 22242, the three second detectors 22242 are arranged and numbered in sequence along the fourth direction, and the three second mounting positions 2211 are numbered in sequence along the fourth direction. When the first storage member 2221 is connected to the first one of the second mounting positions 2211, the second trigger 22241 is arranged opposite to the first one of the second detectors 22242, so as to trigger the first one of the second detectors 22242 to send a signal. Through the signal sent by the first one of the second detectors 22242, it can be known that the first storage member 2221 is connected to the first one of the second mounting positions 2211. When the second mounting position 2211 corresponding to the target plate 300 is the first one of the second mounting positions 2211, the target plate 300 is stored on the storage module 222, and the first jaw 121 and the second jaw 122 can grip the target plate 300, reducing the error rate of the gripping mechanism 100. When the second mounting position 2211 corresponding to the target plate 300 is not the first one of the mounting positions, the target plate 300 is not stored on the storage module 222, and an alarm device 250 provided on the rack 210 may be used to alarm to remind the operator to change the plate 300.

By adopting the technical solution of this embodiment, it is possible to detect whether the first storage member 2221 is connected to the second mounting position 2211 corresponding to the target plate 300 by the second trigger 22241 triggering the second detector 22242 corresponding to the second detection position, so that the first detection module 124 has a simple structure and is convenient to process and manufacture.

In another embodiment of the present application, as shown in FIGS. 7 and 8, the second detector 22242 of the loading device 10 provided includes a proximity switch, and the second trigger 22241 includes a metal trigger configured to trigger the proximity switch.

The proximity switch may refer to a position switch that can be operated without direct mechanical contact with a moving component, and the metal trigger may refer to a metal component that can trigger the proximity switch. When in use, the metal trigger is located in a sensing area of the proximity switch corresponding to the second detection position when the first storage member 2221 is connected to the second detection position, and the proximity switch can quickly send an electrical signal. The position information of the second detection position can be accurately determined according to the electrical signal.

By adopting the technical solution of this embodiment, the structural form in which the metal trigger triggers the proximity switch is used, and the triggering accuracy is thus high, so that the accuracy of detection of the position information of the second detection position is good, and the structure is simple, facilitating the reduction of the cost of the bin mechanism 200.

In another embodiment of the present application, for the loading device 10 provided, when the second storage member 2222 is movably connected to the support member 221, a movable connection structure between the second storage member 2222 and the support member 221 is the same as the movable connection structure between the first storage member 2221 and the support member 221.

By the movable connection structure between the second storage member 2222 and the support member 221 being the same as the movable connection structure between the first storage member 2221 and the support member 221, it can be understood that the movable connection method between the second storage member 2222 and the support member 221 is the same as the movable connection method between the first storage member 2221 and the support member 221. The movable connection method between the second storage member 2222 and the support member 221 may refer to the movable connection method between the first storage member 2221 and the support member 221 in the above embodiments, and will not be repeated here.

By adopting the technical solution of this embodiment, the movable connection structure between the second storage member 2222 and the support member 221 is the same as the movable connection structure between the first storage member 2221 and the support member 221, the structure is simpler, and the processing and manufacturing is convenient.

Figure 9:
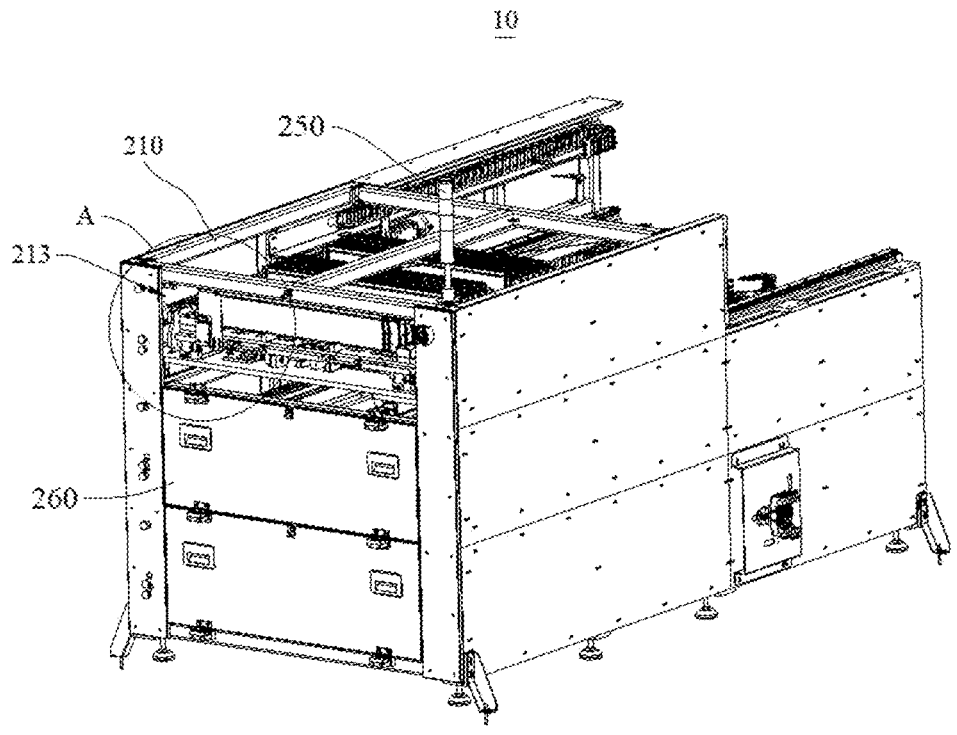
FIG. 9 is a structural schematic diagram of the loading device shown in FIG. 5 when viewed from another perspective.
Figure 10:
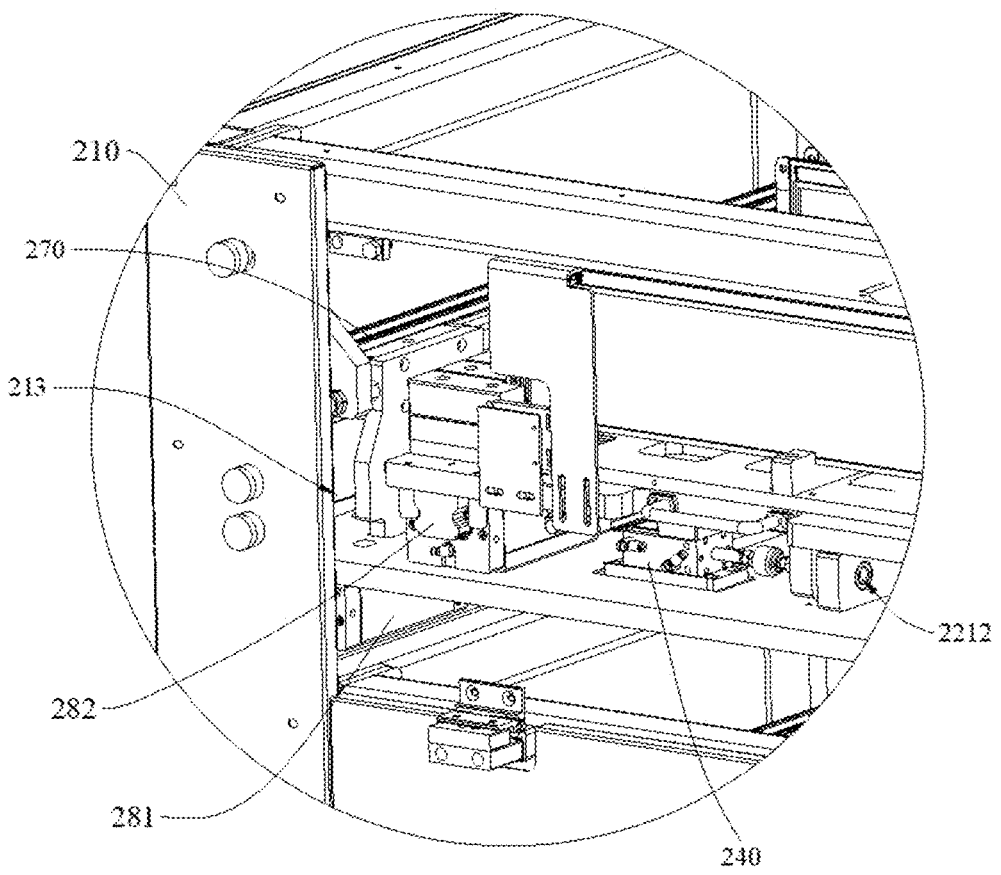
FIG. 10 is an enlarged view of part A in FIG. 9.

In another embodiment of the present application, as shown in FIGS. 6, 9 and 10, the bin mechanism 200 of the loading device 10 provided includes a plurality of storage assemblies 220, the plurality of storage assemblies 220 are located in an accommodating space 211 enclosed by the rack 210, a top portion of the rack 210 is configured with a first opening 212 for allowing the gripping mechanism 100 to enter the accommodating space 211, and the plurality of storage assemblies 220 are stacked along the height of the rack 210; and each of the storage assemblies 220 is connected to a sliding member 230, and each of the sliding members 230 is slidably connected to the rack 210, such that the sliding member 230 can drive the corresponding storage assembly 220 to slide in a first direction (reference may be made to the direction indicated by arrow X shown in FIG. 6) between the bottom of the first opening 212 and a side of the first opening 212.

The accommodating space 211 may refer to a space enclosed by the rack 210, and the accommodating space 211 provides a space for mounting the plurality of storage assemblies 220.

The first opening 212 may refer to an opening provided in the top portion of the rack 210, the opening can allow the gripping mechanism 100 to enter the accommodating space 211 to grip the plate 300 stored in the storage assembly 220.

For the height direction of the rack 210, reference may be made to the direction indicated by arrow Y in FIG. 5. The plurality of storage assemblies 220 are stacked in the height direction of the rack 210, so that it is possible to make full use of the space inside the rack 210 and facilitate the miniaturization design of the bin mechanism 200.

The sliding member 230 may refer to a component connected between the storage assembly 220 and the rack 210, and this component is slidably connected to the rack 210, so that the sliding member 230 slides relative to the rack 210 so as to drive the corresponding storage assembly 220 to slide relative to the rack 210, so that the storage assembly 220 can slide back and forth in the first direction of movement between the bottom of the first opening 212 and the side of the first opening 212. When the storage assembly 220 moves to the bottom of the first opening 212, the gripping assembly can grip the plate 300 stored in the storage assembly 220. When the storage assembly 220 moves to the side of the first opening 212, the storage assembly 220 can move to the bottom of the lower storage assembly 220, so that the lower storage assembly 220 is exposed, so as to facilitate the gripping assembly to grip a plate 300 on the lower storage assembly 220.

By adopting the technical solution of this embodiment, the design of a plurality of storage assemblies 220 can meet the requirements for storing more plates 300, and also enable the bin mechanism to simultaneously store plates 300 of multiple specifications and sizes, so as to facilitate the change of plates 300. In addition, the storage assembly 220 can move from the bottom of the first opening 212 to the side of the first opening 212, so that the lower storage assembly 220 located below this storage assembly 220 can be exposed, so as to facilitate the gripping assembly to grip a plate 300 on the lower storage assembly 220.

In one embodiment, a second slide rail 281 is connected between the rack 210 and the sliding member 230, and the second slide rail 281 is distributed along the second direction (reference may be made to the direction indicated by arrow X shown in FIG. 6). Under the sliding guidance of the second slide rail 281, the slidable connection between the rack 210 and the sliding member 230 is realized. There are a plurality of second slide rails 281. For example, there are two second slide rails 281, and the two second slide rails 281 are located at two opposite ends of the sliding member 230 to improve the sliding stability of the rack 210 and the sliding member 230.

In one embodiment, the rack 210 is further provided with a fourth driving member 270. The fourth driving member 270 is connected to the sliding member 230 and drives the sliding member 230 to slide relative to the rack 210 in the second direction. The fourth driving member 270 may be an air cylinder, a linear module or other components. Under the drive of the fourth driving member 270, the automatic sliding of the sliding member 230 can be realized. There are a plurality of fourth driving members 270. For example, there are two fourth driving members 270, and the two second slide rails 281 are located at the two opposite ends of the sliding member 230 to improve the sliding stability of the rack 210 and the sliding member 230.

In another embodiment of the present application, as shown in FIGS. 6, 9 and 10, the rack 210 of the loading device 10 provided is configured with a second opening 213 in communication with the accommodating space 211, and the storage assembly 220 is slidably connected to the sliding member 230, such that the storage assembly 220 can enter and exit the accommodating space 211 through the second opening 213 in the second direction.

The second opening 213 may refer to an opening formed by the rack 210, and the storage assembly 220 and the sliding member 230 can slide relative to each other, so that the storage assembly 220 can enter and exit the accommodating space 211 through the second opening 213 in the second direction. When the storage assembly 220 moves out of the accommodating space 211 through the second opening 213, that is, the storage assembly 220 moves out of the rack 210 and the storage assembly 220 is exposed outside the rack 210, the loading of the plate 300 of the storage assembly 220 can be facilitated. After the loading is completed, the storage assembly 220 can be pushed into the accommodating space 211 through the second opening 213, so as to be griped by the gripping mechanism 100.

By adopting the technical solution of this embodiment, the storage assembly 220 can be moved out of the accommodating space 211 through the second opening 213, and the storage assembly 220 is exposed outside the rack 210, so that the loading of the plate 300 of the storage assembly 220 can be facilitated.

In one embodiment, a switch door assembly 260 is provided at the second opening 213 to cooperate with the loading of the plate 300.

In another embodiment of the present application, for the loading device 10 provided, the first direction is parallel to the second direction.

By adopting the technical solution of this embodiment, the sliding direction of the sliding member 230 relative to the rack 210 is parallel to the sliding direction of the storage assembly 220 relative to the sliding member 230. In this design, a single sliding direction is provided, the structure of the bin mechanism 200 can be designed more simply, and the risk of sliding interference can also be reduced.

In one embodiment, a second slide rail 281 is connected between the storage assembly 220 and the sliding member 230, and the second slide rail 281 is distributed along the second direction. Under the sliding guidance of the second slide rail 281, the slidable connection between the storage assembly 220 and the sliding member 230 is realized. Illustratively, the second slide rail 281 is connected between the first support plate 2214 and the sliding member 230, and a side portion of the first support plate 2214 that faces away from the sliding member 230 is slidably connected to a guide rail 2811 in the second slide rail 281 by means of a sliding block 2812, to increase the sliding stability of the storage assembly 220. There are a plurality of second slide rails 281. For example, there are two second slide rails 281, and the two second slide rails 281 are located at the two opposite ends of the sliding member 230 to improve the sliding stability of the storage assembly 220 and the sliding member 230.

In another embodiment of the present application, as shown in FIGS. 6, 9 and 10, the bin mechanism 200 of the loading device 10 provided further includes a third locking member 240. The third locking member 240 is configured to lock and connect the sliding member 230 to the storage assembly 220.

The third locking member 240 may refer to a component capable of locking the sliding member 230 to the storage assembly 220. When the third locking member 240 locks the sliding member 230 to the storage assembly 220, the storage assembly 220 is fixedly connected to the sliding member 230, so that the sliding member 230 sliding relative to the rack 210 can drive the storage assembly 220 to slide relative to the rack 210, and the storage assembly 220 thus can move back and forth between the bottom of the first opening 212 and the side of the first opening 212. When the third locking member 240 unlocks the sliding member 230 from the storage assembly 220, the storage assembly 220 and the sliding member 230 can slide relative to each other, so that the storage assembly 220 can slide out of the rack 210 from the second opening 213 for loading.

By adopting the technical solution of this embodiment, during the sliding of the sliding member 230 relative to the rack 210, the third locking member 240 may fixedly connect the sliding member 230 to the storage assembly 220, so that the sliding member 230 can drive the storage assembly 220 to slide relative to the rack 210, so as to facilitate the gripping assembly to grip a plate 300 stored on the lower storage assembly 220.

In another embodiment of the present application, as shown in FIGS. 6, 9 and 10, one of the sliding member 230 and the storage assembly 220 of the loading device 10 provided is provided with a locking hole 2212, the other thereof is connected to the third locking member 240, and an end portion of the third locking member 240 is configured to be inserted into the locking hole 2212, so as to lock and connect the sliding member 230 to the storage assembly 220.

It can be understood that the sliding member 230 is connected to the third locking member 240, and the locking hole 2212 is provided in the storage assembly 220: or the storage assembly 220 is connected to the third locking member 240, and the locking hole 2212 is provided in the sliding member 230. The end portion of the locking member is inserted into the locking hole 2212, so as to lock the sliding member 230 to the storage assembly 220. The third locking member 240 may be an air cylinder, a screw, a pin or other components. Illustratively, the third locking member 240 is an air cylinder mounted on the sliding member 230, and the locking hole 2212 is provided in the support member 221. A piston rod of the air cylinder is inserted into the locking hole 2212, such that the sliding member 230 and the support member 221 are locked and connected together. The piston rod of the air cylinder retracts and moves out of the locking hole 2212, the locking between the sliding member 230 and the support member 221 is released. At this time, the support member 221 can be pulled, to drive the storage module 222 to move out of the rack 210 for loading.

By adopting the technical solution of this embodiment, the locking form in which the third locking member 240 cooperates with the locking hole 2212 has a simple structure and is convenient to process and manufacture.

In another embodiment of the present application, as shown in FIGS. 5 to 10, a loading control method is provided. The loading control method includes:

receiving first specification information of a plate 300 that can be griped by a gripping mechanism 100;
  receiving second specification information of a plate 300 stored in a storage module 222 to be unloaded in a bin mechanism 200; and
  controlling the gripping mechanism 100 to grip the plate 300 stored in the storage module 222 to be unloaded when the first specification information, the second specification information and specification information of a target plate 300 are consistent with one another.

By receiving first specification information of a plate 300 that can be griped by a gripping mechanism 100, it can be understood that the gripping mechanism 100 may be a gripping mechanism 100 of the above embodiments, the spacing between the first jaw 121 and the second jaw 122 can be determined by detecting the first jaw 121, the second jaw 122 and the mounting positions of the base body 110 in the gripping mechanism 100, and the spacing can be in one-to-one correspondence with the specification and size information of the plate 300, that is, the specification and size information of the plate 300 that can be gripped by the gripping mechanism 100 can be determined based on the spacing, then the detection of the first jaw 121, the second jaw 122 and the mounting positions of the base body 110 can be converted to obtain the first specification information of the plate 300 that can be gripped by the gripping mechanism 100. For example, when the first jaw 121 is connected to different first mounting positions 111 on the base body 110 via the first adjusting member 123, and the second jaw 122 is connected to different third mounting positions 112 on the base body 110 via the second adjusting member 126, so as to change the spacing between the first jaw 121 and the second jaw 122, the position information of the first detection position and the position information of the third detection position obtained by the first detection module 124 and the third detection module 127 can be converted to obtain the first specification information of the plate 300 that can be griped by the gripping mechanism 100.

By receiving second specification information of a plate 300 stored in a storage module 222 to be unloaded in a bin mechanism 200, it can be understood that the bin mechanism 200 may be a bin mechanism 200 as described in the above embodiments, and the storage module 222 to be unloaded may be a storage module 222 as described in the above embodiments: the spacing between the first storage member 2221 and the second storage member 2222 can be determined by detecting the first storage member 2221, the second storage member 2222 and the mounting positions of the support member 221 in the storage module 222, and the spacing can be in one-to-one correspondence with the specification information of the plate 300, that is, the specification and size information of the plate 300 stored on the storage module 222 can be determined based on the spacing. For example, when the second storage member 2222 is fixedly connected to the support member 221, and the first storage member 2221 is connected to different second mounting positions 2211 on the support member 221, so as to change spacing between the first storage member 2221 and the second storage member 2222, the position information of the second detection position obtained by the second detection module 2224 can be converted to obtain the second specification information of the plate 300 stored in the storage module 222 to be unloaded.

By controlling the gripping mechanism 100 to grip the plate 300 stored in the storage module 222 to be unloaded when the first specification information, the second specification information and specification information of a target plate 300 are consistent with one another, it can be understood that, the first specification information of the plate 300 that can be gripped by the gripping mechanism 100, the second specification information of the plate 300 stored in the storage module 222 to be unloaded in the bin mechanism 200, and the specification information of the target plate 300 are matched with one another, that is, the gripping mechanism 100 can grip the target plate 300, and the target plate 300 is stored in the storage module 222 to be unloaded, so that the gripping mechanism 100 can stably grip the target plate 300 from the storage module 222, so as to accurately deliver the target plate to a subsequent apparatus, thereby reducing the error rate of change of the plate 300.

The specification information of the target plate 300 may be manually input into a control device configured to control the gripping mechanism 100 to grip the plate 300 stored in the storage module 222 to be unloaded, or may be read from a storage unit of the control device. The loading control method can realize the combination of software and hardware. The control device controls the movement of components and reads the information from the storage unit, which are relatively mature technologies and will not be described in detail here.

By adopting the technical solution of this embodiment, it can be accurately determined whether the gripping mechanism 100 is in a state in which the target plate 300 can be gripped, and whether the target plate 300 is stored in the storage module 222 to be unloaded. When the first specification information, the second specification information and the specification information of the target plate 300 are consistent with one another, the gripping mechanism 100 can grip the target plate 300, and the target plate 300 is stored in the storage module 222 to be unloaded, so that the gripping mechanism 100 can stably grip the target plate 300 from the storage module 222, so as to accurately deliver the target plate to a subsequent apparatus, thereby reducing the error rate of change of the plate 300.

The above descriptions of the various embodiments tend to emphasize the differences between the various embodiments, and the same or similar points can be referred to each other. For the sake of brevity, details are not repeated herein.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A gripping mechanism, comprising:
   a base body, with a clamping zone being configured on one side of the base body; and
   a first gripping assembly comprising a first jaw and a second jaw, with the first jaw being arranged on one of two opposite sides of the clamping zone, and the second jaw being arranged on the other side;
   wherein at least one of the first jaw and the second jaw is movably connected to the base body, such that a spacing between the first jaw and the second jaw is adjustable,
   the gripping mechanism further comprises a distance detector and a sensor, wherein the distance detector is configured to detect a distance value between the plate and the distance detector; when the distance value is within a preset range, the plate is located in the clamping zone; and the distance detector is further configured to send a gripping signal for gripping the plate, and the sensor is configured to sense the plate in the clamping zone.

2. The gripping mechanism according to claim 1, wherein when the first jaw is movably connected to the base body, the first gripping assembly further comprises a first adjusting structure connected to the first jaw, the base body is configured with a plurality of first mounting positions, and the first adjusting structure is connected to different first mounting positions such that the spacing between the first jaw and the second jaw is variable.

3. The gripping mechanism according to claim 2, wherein the first gripping assembly further comprises a first locker to lock the first adjusting structure to different first mounting positions.

4. The gripping mechanism according to claim 3, wherein the first locker comprises a first fastener, each of the first mounting positions is provided with a first connecting hole, the first adjusting structure is provided with a second connecting hole, and the first fastener passes through the first connecting hole and the second connecting hole to lock the first adjusting structure to the first mounting position.

5. The gripping mechanism according to claim 2, wherein the first gripping assembly further comprises a first detection structure, and the first mounting position connected to the first adjusting structure is a first detection position; and the first detection structure is configured to obtain position information of the first detection position and send the position information of the first detection position.

6. The gripping mechanism according to claim 5, wherein the first detection structure comprises a first trigger and a plurality of first detectors, wherein the plurality of first detectors are arranged in one-to-one correspondence with the plurality of first mounting positions, the first trigger is connected to the first adjusting structure, and the first trigger is configured to trigger the first detector corresponding to the first detection position to send the position information of the first detection position; and the first detector comprises a proximity switch, and the first trigger comprises a metal trigger configured to trigger the proximity switch.

7. The gripping mechanism according to claim 2, wherein when the second jaw is movably connected to the base body, a movable connection structure between the second jaw and the base body is the same as the movable connection structure between the first jaw and the base body.

8. The gripping mechanism according to claim 2, wherein the first jaw further comprises a first driver, the first driver is connected to the first adjusting structure and the first jaw, and the first driver is configured to drive the first jaw to move toward the second jaw, so as to clamp a plate located in the clamping zone.

9. The gripping mechanism according to claim 1, wherein a side portion of the first jaw that faces the clamping zone is provided with a first protective structure to abut against an edge portion of the plate, and the first protective structure has a hardness range of 20 HD-100 HD; and/or a side portion of the second jaw that faces the clamping zone is provided with a second protective structure to abut against a further edge portion of the plate, and the second protective structure has a hardness range of 20 HD-100 HD.

10. The gripping mechanism according to claim 1, further comprising a second gripping assembly, wherein the second gripping assembly comprises a third jaw and a fourth jaw; the third jaw is arranged on one of two further opposite sides of the clamping zone, and the fourth jaw is arranged on the other side; and at least one of the third jaw and the fourth jaw is movably connected to the base body to adjust a spacing between the third jaw and the fourth jaw;

when the third jaw is movably connected to the base body, the second gripping assembly further comprises a second driver, the second driver is connected to the third jaw and the base body, and the second driver is configured to drive the third jaw to move so as to adjust the spacing between the third jaw and the fourth jaw; and when the fourth jaw is movably connected to the base body, the second gripping assembly further comprises a third driver, the third driver is connected to the fourth jaw and the base body, and the third driver is configured to drive the fourth jaw to move so as to adjust the spacing between the third jaw and the fourth jaw.

11. The gripping mechanism according to claim 1, further comprising a moving assembly, wherein the moving assembly is connected to the base body, and the moving assembly is configured to drive the base body to move.

12. The gripping mechanism according to claim 1, wherein a side portion of the base body that faces the clamping zone is provided with a suction structure to suction the plate;

the suction structure comprises a connecting portion and an elastic portion, wherein the connecting portion is connected to the base body and the elastic portion, the elastic portion is located at a side portion of the connecting portion that faces the clamping zone, and a surface of the elastic portion that faces the clamping zone is provided with a vacuum suction hole configured to suction the plate; and the side portion of the base body that faces the clamping zone is further provided with a limiting structure, and a side surface of the limiting structure that faces the clamping zone is configured to abut against the plate.

13. A loading device, comprising a gripping mechanism of claim 1, and a bin structure to store plates, wherein the bin structure comprises a rack and a storage assembly, the storage assembly is connected to the rack, and the storage assembly is capable of storing the plates of different specifications and sizes.

14. The loading device according to claim 13, wherein the storage assembly comprises a support structure and a storage structure, wherein the support structure is connected to the rack; the storage structure comprises a first storage structure and a second storage structure arranged on the support structure, and a storage zone for storing the plates is formed between the first storage structure and the second storage structure; and at least one of the first storage structure and the second storage structure is movably connected to the support structure, such that a spacing between the first storage structure and the second storage structure is adjustable;

on the basis that the first storage structure is movably connected to the base body, the support structure is configured with a plurality of second mounting positions, and the first storage structure is connected to different second mounting positions such that the spacing between the first storage structure and the second storage structure is variable; and the storage structure further comprises a second locker to lock the first storage structure to different second mounting positions.

15. The loading device according to claim 14, wherein the storage structure further comprises a second detection structure, and the second mounting position connected to the first storage structure is a second detection position; and the second detection structure is configured to obtain position information of the second detection position and send the position information of the second detection position; and the second detection structure comprises a second trigger and a plurality of second detectors, wherein the plurality of second detectors are arranged in one-to-one correspondence with the plurality of second mounting positions, the second trigger is connected to the first storage structure, and the second trigger is configured to trigger the second detector corresponding to the second detection position to send the position information of the second detection position.

16. The loading device according to claim 14, wherein when the second storage structure is movably connected to the support structure, a movable connection structure between the second storage structure and the support structure is the same as the movable connection structure between the first storage structure and the support structure.

17. The loading device according to claim 13, wherein the bin structure comprises a plurality of storage assemblies, which are located in an accommodating space enclosed by the rack, a top portion of the rack is configured with a first opening for allowing the gripping mechanism to enter the accommodating space, and the plurality of storage assemblies are stacked along the height of the rack;

each of the storage assemblies is connected to a sliding structure, and each of the sliding structures is slidably connected to the rack, such that the sliding structure can drive the corresponding storage assembly to slide in a first direction between the bottom of the first opening and a side of the first opening;

the rack is configured with a second opening in communication with the accommodating space, and the storage assembly is slidably connected to the sliding structure, such that the storage assembly can enter and exit the accommodating space through the second opening in a second direction; and the first direction is parallel to the second direction.

18. The loading device according to claim 17, wherein the bin structure further comprises a third locker to lock and connect the sliding structure to the storage assembly; and one of the sliding structure and the storage assembly is provided with a locking hole, the other thereof is connected to the third locking structure, and an end portion of the third locking structure is configured to be inserted into the locking hole, so as to lock and connect the sliding structure to the storage assembly.

19. A loading control method, comprising:

providing gripping mechanism, comprising:

a base body, with a clamping zone being configured on one side of the base body; and a first gripping assembly comprising a first jaw and a second jaw, with the first jaw being arranged on one of two opposite sides of the clamping zone, and the second jaw being arranged on the other side;

wherein at least one of the first jaw and the second jaw is movably connected to the base body, such that a spacing between the first jaw and the second jaw is adjustable, the gripping mechanism further comprises a distance detector and a sensor, wherein the distance detector is configured to detect a distance value between the plate and the distance detector when the distance value is within a preset range, the plate is located in the clamping zone; and the distance detector is further configured to send a gripping signal for gripping the plate, and the sensor is configured to sense the plate in the clamping zone;

receiving first specification information of a plate that can be gripped by the gripping mechanism;

receiving second specification information of a plate stored in a storage module to be unloaded in a bin mechanism; and controlling the gripping mechanism to grip the plate stored in the storage module to be unloaded when the first specification information, the second specification information and specification information of a target plate are consistent with one another.

\* \* \* \* \*